US011988775B1

(12) United States Patent
Waschura et al.

(10) Patent No.: US 11,988,775 B1
(45) Date of Patent: May 21, 2024

(54) DYNAMIC SENSOR ILLUMINATION

(71) Applicant: Zoox, Inc., Foster City, CA (US)

(72) Inventors: Harrison Thomas Waschura, Los Altos Hills, CA (US); Turhan Karadeniz, Oakland, CA (US); Ryan McMichael, Mountain View, CA (US); Robert Nicholas Moor, San Mateo, CA (US); Denis Nikitin, Campbell, CA (US); Subasingha Shaminda Subasingha, San Ramon, CA (US); Joseph Patrick Warga, San Francisco, CA (US); Silas Kogure Wilkinson, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 646 days.

(21) Appl. No.: 16/719,565

(22) Filed: Dec. 18, 2019

(51) Int. Cl.
*G01S 7/484* (2006.01)
*G01S 17/10* (2020.01)

(52) U.S. Cl.
CPC .............. *G01S 7/484* (2013.01); *G01S 17/10* (2013.01)

(58) Field of Classification Search
CPC ........................................................ G01S 7/484
See application file for complete search history.

(56) References Cited

U.S. PATENT DOCUMENTS

| | | | |
|---|---|---|---|
| 8,027,587 B1 * | 9/2011 | Watts ................. | G02B 6/12007 359/107 |
| 8,836,922 B1 * | 9/2014 | Pennecot .............. | G01S 7/4815 356/9 |
| 9,041,915 B2 * | 5/2015 | Earhart ................. | G01S 17/894 356/3.01 |
| 9,383,753 B1 * | 7/2016 | Templeton .............. | G01S 17/89 |
| 9,491,441 B2 * | 11/2016 | Sarmast .................. | G06F 3/005 |
| 2012/0038817 A1 * | 2/2012 | McMackin ............ | H04N 25/00 348/E5.045 |
| 2020/0072946 A1 * | 3/2020 | Fisher .................... | G01S 7/4863 |
| 2020/0402209 A1 * | 12/2020 | Talbert ...................... | G06T 5/50 |

FOREIGN PATENT DOCUMENTS

| | | | | |
|---|---|---|---|---|
| CN | 110249255 A | * | 9/2019 | ............ F21V 14/003 |
| CN | 110402399 A | * | 11/2019 | ............... A01C 5/04 |

OTHER PUBLICATIONS

Grabherr, Martin, et al., "New markets for VCSELS: pulsed operation of high-power devices," Proc. SPIE 6484, Vertical-Cavity Surface-Emitting Lasers XI, 648407 (Feb. 7, 2007); doi: 10.1117/12.697047, Integrated Optoelectronic Devices 2007, 2007, San Jose, California.*

Google Patents Machine Translation of KR101879478B1 to Microsoft (Aug. 30, 11) (Year: 2011).*

* cited by examiner

*Primary Examiner* — Jean Paul Cass
(74) *Attorney, Agent, or Firm* — Lee & Hayes, P.C.

(57) ABSTRACT

Sensors, including time-of-flight sensors, may be used to detect objects in an environment. In an example, a vehicle may include a time-of-flight sensor that images objects around the vehicle, e.g., so the vehicle can navigate relative to the objects. Sensor data generated by the time-of-flight sensor can be impacted by glare. In some examples, an emitter system for illuminating a field of view can be dynamically altered to provide different illumination intensities at different regions in the field of view. For instance, locations at which a highly-reflective object or other object that is likely to cause glare may be illuminated at a lower illumination intensity, e.g., to reduce the likelihood of pixel saturation in measured data associated with the object.

20 Claims, 7 Drawing Sheets

DYNAMIC SENSOR ILLUMINATION

BACKGROUND

Sensors, such as time-of-flight sensors, may be unreliable in certain environments, including environments in which objects have high reflectivity. For instance, highly reflective objects can cause glare, and glare can result in inaccurate sensor measurements. Such inaccuracies can create difficulties in appropriately identifying and/or characterizing the highly reflective object, as well as other objects in the data. When such a sensor is intended for use on an autonomous vehicle, for instance, glare can be a hindrance to identifying and/or characterizing potential obstacles to travel, thereby reducing safety.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
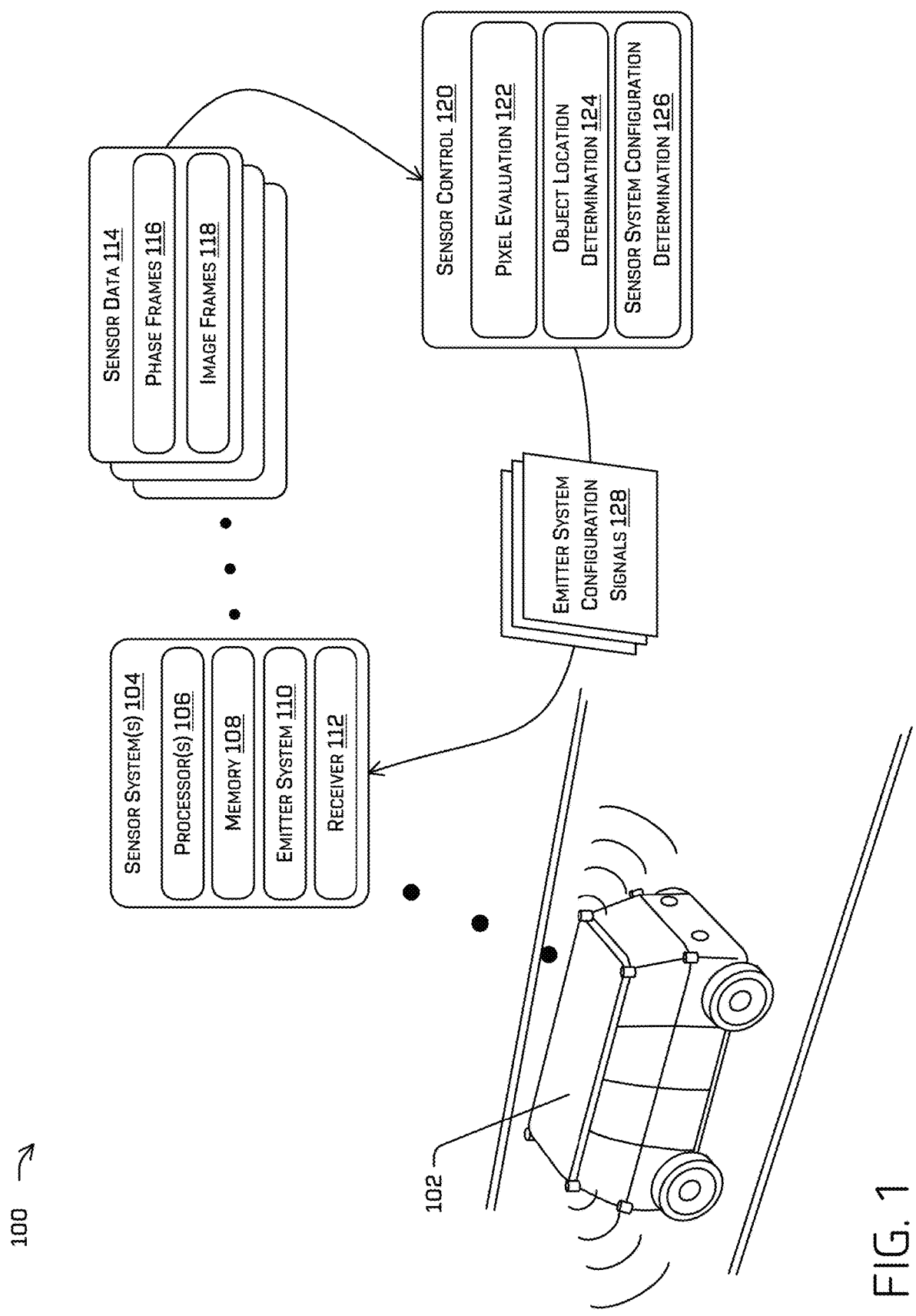
FIG. 1 is a schematic illustration showing an example vehicle, such as an autonomous vehicle, and example components and functionality of a sensor system associated with the vehicle, as described herein.

This disclosure describes methods, apparatus, and systems for generating sensor data that can be used to identify objects in an environment and to control a vehicle relative to those identified objects including, but not limited to, modifying one or more sensor parameters to optimize data capture. For example, an autonomous vehicle can include a plurality of sensors to capture sensor data corresponding to an environment of the vehicle. The sensor data can include data associated with the environment, which, in some instances, can include multiple objects (e.g., pedestrians, vehicles, bicyclists, etc.). Oftentimes, different sensor modalities are used for redundancy purposes and/or because of inherent shortcomings in the sensors. For example, time-of-flight sensors, relative to other sensor types, may generate sensor data more quickly and/or may be more reliable at shorter ranges. As a result of these characteristics, some vehicle implementations may use time-of-flight sensors in safety critical applications, e.g., to recognize objects in close proximity to the vehicle and/or to avoid imminent collisions. However, in some instances intensity and distance information generated by time-of-flight sensors may be unreliable due to one or more of oversaturation, glare caused by highly reflective objects, pixel noise from stray light, under exposure, ambiguous returns, or the like. Techniques described herein can be used to improve sensor data, including time-of-flight sensor returns. For example, in implementations described herein, a number of unreliable pixels caused by glare, e.g., saturated or overexposed pixels, may be reduced by dynamically altering illumination characteristics, such as by altering aspects of an emitter system to selectively illuminate portions of the sensed environment. For instance, a first region of a field of view of the sensor may be illuminated differently from a second region of the field of view. This selective illumination may result in improved intensity data and/or depth data, e.g., because objects likely to cause glare may be illuminated with a lower intensity, which may reduce glare. Such techniques may, in some instances, result in a better understanding of the environment of the vehicle, thereby leading to safer navigation and/or more confident controlling of the vehicle.

As discussed herein, sensor data can be captured by one or more sensors, which can include time-of-flight sensors, RADAR sensors, LiDAR sensors, SONAR sensors, image sensors, microphones, or any combination thereof. The sensor can include an emitter to emit a signal and a sensor to sense a return signal from the environment. In the context of a time-of-flight sensor, the captured sensor data can be represented, for example, in a raw (e.g., a quadrature) format. In some instances, the sensor data in the quadrature format can include one or more pixels where each pixel can be represented as a numerical value (e.g., 12 bits with a value range of $2^{-11}$ to $(2^{11}-1)$). After determining the sensor data in the quadrature format, a sensor computing device (e.g., an FPGA, SoC, ASIC, CPU, etc.) can determine the sensor data in an intensity and depth format. In some instances, the intensity and depth format can include an intensity image and a depth image having, respectively, per-pixel intensity and depth values. In some implementations, the sensor computing device can also, using the sensor data in the intensity and depth format, perform an unprojection operation (mapping 2D data to 3D data) to determine the sensor data in an unprojected format to project each pixel in the sensor data into a multi-dimensional space (e.g., 3D-space using an x-position, a y-position, and a z-position).

In implementations described herein, a sensor, a sensor computing device, and/or another computing system in communication with the sensor can determine updated sensor configurations that may remove the effects of glare from measured data. As described above, glare may be caused when emitted light, e.g., illumination light from the sensor, reflects off highly reflective objects. Upon entering the lens of the receiver, the light reflected off these highly reflective objects can scatter, effecting pixels in the receiver associated with the object as well as other pixels, including adjacent pixels. Image data that includes the effects of glare may be inaccurate and correcting for these inaccuracies can provide improved safety outcomes among other benefits.

In some examples, techniques described herein for correcting for glare can include altering an illumination intensity within a field of view of a sensor. For instance, an illumination intensity at portions of a field of view that correspond to a highly-reflective object can be reduced, thereby reducing the intensity of the return carrier. However, illumination intensities at other portions of the field of view may be relatively higher. In some examples, a sensing system can emit light from a plurality of light emitting elements, which may be lasers, such as vertical-cavity surface-emitting lasers (VCSELs). Selectively driving individual of the light emitting elements can result in varied illumination intensities across the field of view. In some instances, subsets of the light emitting elements may be controlled. In one non-limiting example, the light emitting elements can be arranged in an array, e.g., of rows and columns, with the illumination intensity being controlled by selectively activating/deactivating the rows/columns.

In some examples, a sensing system can include a projection system for altering the illumination intensity. For instance, a projection system can include a plurality of digital micromirror devices that alter light passing therethrough. In some examples, such micromirror devices may be configurable in a first position that reflects light in an intended direction and in a second position that reflects or otherwise reroutes light passing therethrough in a second direction. A plurality of micromirror devices can be configured in an array, with individual of the devices being controlled to selectively illuminate areas of the field of view. As in the previous example, the micromirror devices can be controlled such that regions of a field of view associated with highly reflected objects are subjected to a lower illumination intensity.

In still further examples, the sensing system can include a configurable mask for altering the intensity of illumination emitted by one or more light emitters. The mask may be a liquid crystal display (LCD) may be arranged between the light emitting element(s) and the environment to be sensed, and the LCD may have a plurality of pixels that have a configurable opacity. In this system, altering the opacity of selected pixels in the LCD can selectively illuminate areas of the field of view, e.g., by allowing different amounts of illumination light through different pixels of the LCD. As in the previous examples, the pixels of the LCD can be controlled such that regions of a field of view associated with highly reflected objects are subjected to a lower illumination intensity.

Techniques described herein can also determine regions or locations associated with a source of glare, e.g., highly-reflective objects and/or objects close to the sensor. In some examples, these regions or locations can be used as regions at which the illumination intensity is to be adjusted. For instance, oversaturated pixels in sensor data generated by the sensing device may correspond to highly-reflective objects. Accordingly, techniques described herein can determine that the position(s) of these pixels correspond to objects that should be illuminated with a lower illumination intensity. However, and as noted above, glare can affect more pixels than just those that correspond to highly-reflective objects. Other techniques can include receiving additional sensor data, e.g., from different sensor modalities, and identifying objects based on this additional sensor data.

Techniques described herein can also generate signals to control the illumination intensity of portions of the field of view of the sensor. For instance, the signals can cause a subset of light emitter(s) to reduce an amount of emitted light or turn off entirely. In other examples, the control signals can control a projection system and/or an LCD associated with the system to differently illuminate portions of the field of view of the sensor. As noted above, altering the illumination can provide improved sensor returns, resulting in more accurate data than the measured data, because the effects of glare have been removed. In at least some examples, a feedback loop may be used to continually determine a level of crispness, saturation, blur, scattering, etc. associated with the intensity image generated by the sensor in order to actively control such illumination.

In some examples, sensor data generated by the sensor configured to account for highly-reflective objects, e.g., that has differently illuminated regions, free of the effects of the glare, may be provided to, received by, or otherwise accessed by a computing device of an autonomous vehicle. For instance, the autonomous vehicle may use the image data to determine one or more trajectories for proceeding relative to objects determined from the data. In some instances, depth and/or intensity information generated according to techniques described herein may be combined, or fused, with data from other sensor modalities to determine the one or more trajectories.

Techniques described herein may be directed to leveraging sensor and perception data to enable a vehicle, such as an autonomous vehicle, to navigate through an environment while circumventing objects in the environment. Techniques described herein can utilize information sensed about the objects in the environment, e.g., by a time-of-flight sensor, to improve data and more accurately determine features of the objects. For example, techniques described herein may be faster and/or more robust than conventional techniques, as they may increase the reliability of depth and/or intensity information, potentially alleviating the need for extensive post-processing, duplicate sensors, and/or additional sensor modalities. That is, techniques described herein provide a technological improvement over existing sensing, object detection, classification, prediction and/or navigation technologies. In addition to improving the accuracy with which sensor data can be used to determine objects and correctly characterize motion of those objects, techniques described herein can provide a smoother ride and improve safety outcomes by, for example, more accurately providing safe passage to an intended destination.

While this disclosure uses an autonomous vehicle in examples, techniques described herein are not limited to application in autonomous vehicles. For example, any system in which inconsistent sensor data exists, e.g., caused at least in part by glare, may benefit from the techniques described. By way of non-limiting example, techniques described herein may be used on aircrafts, e.g., to alter an illumination intensity associated with objects in an airspace or on the ground. Moreover, non-autonomous vehicles could also benefit from techniques described herein, e.g., for collision detection and/or avoidance systems. The techniques described herein may also be applicable to non-vehicle applications. By way of non-limiting example, techniques and implementations described herein can be implemented in any system, including non-vehicular systems, that generates, uses, and/or outputs sensor data, such as time-of-flight sensor data.

FIGS. 1-8 provide additional details associated with the techniques described herein.

FIG. 1 illustrates an example environment 100 through which an example vehicle 102 is traveling. The example vehicle 102 can be a driverless vehicle, such as an autonomous vehicle configured to operate according to a Level 5 classification issued by the U.S. National Highway Traffic Safety Administration. The Level 5 classification describes a vehicle capable of performing all safety-critical functions for an entire trip, with the driver (or occupant) not being expected to control the vehicle at any time. In such examples, because the vehicle 102 can be configured to control all functions from start to completion of the trip, including all parking functions, the vehicle may not include a driver and/or controls for manual driving, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The example vehicle 102 can be any configuration of vehicle, such as, for example, a van, a sport utility vehicle, a cross-over vehicle, a truck, a bus, an agricultural vehicle, and/or a construction vehicle. The vehicle 102 can be powered by one or more internal combustion engines, one or more electric motors, hydrogen power, any combination thereof, and/or any other suitable power source(s). Although the example vehicle 102 has four wheels, the systems and methods described herein can be incorporated into vehicles having fewer or a greater number of wheels, tires, and/or tracks. The example vehicle 102 can have four-wheel steering and can operate generally with equal performance characteristics in all directions. For instance, the vehicle 102 may be configured such that a first end of the vehicle 102 is the front end of the vehicle 102, and an opposite, second end of the vehicle 102 is the rear end when traveling in a first direction, and such that the first end becomes the rear end of the vehicle 102 and the second end of the vehicle 102 becomes the front end of the vehicle 102 when traveling in the opposite direction. Stated differently, the vehicle 102 may be a bi-directional vehicle capable of travelling forward in either of opposite directions. These example characteristics may facilitate greater maneuverability, for example, in small spaces or crowded environments, such as parking lots and/or urban areas.

A vehicle such as the example vehicle 102 can be used to travel through the environment 100 and collect data. For example, the vehicle 102 can include one or more sensor systems 104. The sensor system(s) 104 can be, for example, one or more time-of-flight sensors, LiDAR sensors, RADAR sensors, SONAR sensors, image sensors, audio sensors, infrared sensors, location sensors, etc., or any combination thereof. Certain implementations described herein may be particularly well-suited for use with time-of-flight sensors, although other types of sensors also are contemplated. The sensor system(s) 104 may be disposed to capture sensor data associated with the environment. For example, the sensor data may be processed by a vehicle control system to identify and/or classify objects in the environment, e.g., trees, vehicles, pedestrians, buildings, road surfaces, signage, barriers, road markings, or the like and/or to navigate the vehicle 102 relative to such object(s).

As also illustrated in FIG. 1, the sensor system(s) 104 can include one or more processors 106 and memory 108 communicatively coupled to the processor(s) 106. The memory 108 can store processor-executable instructions executable by the processor(s) 106 to cause the sensor system(s) 104 to perform functions that identify objects in the environment 100 that cause glare and/or correct the data to remove the impact of the glare, as detailed herein. The processor(s) 106 and/or the memory 108 may be physically integrated into the sensor system(s), e.g., as an SoC, FPGA, ASIC, or the like, or, in some implementations, the processor(s) 106 and/or the memory 108 may be available to, e.g., connected to receive signals from and/or send signals to, the sensor system(s) 104. As discussed above, the sensor system(s) 104 can determine the sensor data in various formats (e.g., a quadrature format, an intensity and depth format, and/or an unprojected format) using the processor(s) 106.

In the example of FIG. 1, the sensor system(s) 104 can also include an emitter system 110 and a receiver 112. The sensor system(s) 104 may include a time-of-flight sensor. Accordingly, the emitter system 110 may be configured to emit a carrier (e.g., a signal) and the receiver 112 may be configured to receive, e.g., capture, a response carrier (e.g., a response signal). The response carrier may be the carrier reflected off a surface in the environment 100. The time-of-flight sensor may be configured to determine sensor data in a quadrature format based on the carrier and the response carrier. In some instances, the sensor can measure a phase shift between the carrier and the response carrier and/or perform numerical integration calculation to determine the sensor data in the quadrature format (e.g., determining one or more of a quadrature from the response signal). In some implementations, the sensor can also determine an intensity and depth format of the sensor data, which may also be referred to as an intensity image and a depth image, respectively. For example, using the quadrature data, the sensor system can determine depth values and intensity values for each of a plurality of pixels representing a sensed environment and generate the depth and intensity images based on such values.

As detailed further herein, aspects of the emitter system 110 may be configurable. For instance, a modulation frequency and/or an intensity of the carrier emitted by the emitter system 110 can be altered. Moreover, the emitter system 110 may be configurable such that regions of a field of view illuminated by the emitter system 110 may be differently illuminated. In some examples, the emitter system 110 can include multiple emitters, e.g., an array of laser emitters, and the multiple emitters can be controlled individually (on, off, or gradations therebetween) or in subsets to differently illuminate the field of view. In one non-limiting example, a first emitter or first subset of emitters may have a reduced illumination (or no illumination) relative to a second emitter or second subset of emitters. Additional details of this example are provided herein, including in connection with FIG. 3, described below. In some instances, the illumination intensity associated with a carrier emitted by the emitter system 110 can be altered by adjusting the voltage and/or frequency input to the emitter system 110. In other examples, the emitter system 110 can include a projection system that alters the carrier signal. For instance, the projection system can include an array of digital micromirror devices that are configured in two positions—a first position in which light passes through substantially unobstructed and a second position that diverts or reflects light, e.g., away from the field of view. As detailed further below with reference to FIG. 4, the micromirror devices can be selectively configured in the first position or the second position to selectively illuminate portions of the field of view, e.g., while selectively reducing (or preventing) illumination at other portions of the field of view. In still further examples, the emitter system 110 can include a liquid crystal display (LCD) or other mask having selective opacity. For instance, emitted carrier(s) may pass through the LCD, and pixels of the LCD can be driven to selectively allow or inhibit passage of the carrier therethrough. Additional details of this example are provided herein, including with reference to FIG. 5, below. Also in examples, an integration or exposure time of the receiver 112 may be altered, e.g., by controlling an amount of time over which the receiver 112 collects response carriers.

Selectively altering the illumination power and/or the integration time can tune the sensor system(s) 104. For instance, techniques described herein may be useful to reduce the illumination intensity proximate areas of the field of view including highly-reflective objects, including but not limited to retroreflectors and/or objects close to the sensor system(s) 104. Lower intensity illumination and/or shorter integration times can result in increased performance in these areas, e.g., because oversaturation is less likely with reduced illumination. Conversely, higher intensity illumination and/or longer integration times can result in increased performance in relatively lower ambient light environments and/or when the response carrier is from farther-away objects and/or objects having lower reflectivity.

As also illustrated in FIG. 1, the sensor system(s) 104 may be configured to output generated data as sensor data 114. For example, the sensor data 114 can include quadrature values, intensity and depth information, or the like. In the illustrated example, the sensor data 114 can include phase frames 116 and/or image frames 118. As noted above, the emitter system 110 emits a carrier and the receiver 112 receives a response carrier. In examples, the carrier may be amplitude-modulated light and the response carrier will have a phase shift relative to the carrier. Upon receipt at the receiver 112, the response carrier includes a phase value. Such values may be included in the phase frames 116. The sensor system(s) 104 may compute intensity and/or depth values based at least in part on phase values of a plurality of phase frames, e.g., four phase frames 116. The intensity and depth values calculated using the phase frames 116 can be embodied as the image frames 118. The image frames 118 can include a stream of serially-generated (e.g., at a predetermined interval) image frames 118. Generally, each of the image frames 118 may include the same type of data, e.g., data related to the intensity and depth for each of a plurality of pixels comprising the receiver 112 of the sensor. Specifically, the image frames 118 can include a depth image and an intensity image generated by the sensor system(s) 104 and representative of a portion of the environment 100. Similarly, other instances, e.g., frames, of the image data 118 can include both an intensity image and a depth image representative of the environment 100 at the corresponding sensing time.

As noted above, different attributes of the environment 100 can result in degraded sensor data quality. For instance, ambient light, e.g., sunlight, may have the same or a similar wavelength as illumination light emitted and thus, can be perceived at pixels of the receiver 112 of the time-of-flight sensor as returns, despite not corresponding to emitted light. In high ambient light conditions, sunlight, in combination with light emitted by the emitter 110 can result in oversaturation of pixels. Moreover, highly reflective objects and/or objects that are extremely close to the sensor can result in stray light and/or glare that can adversely impact pixel quality. Techniques described herein can use the phase frames 116 and/or the image frames 118 to determine settings associated with the emitter system 110, e.g., to reduce the impact of environmental factors, including those just described, on pixel quality. Controlling aspects of the emitter system 110 can provide an improved dataset that may better represent the environment and/or may have a higher associated confidence.

As illustrated in FIG. 1, a sensor control system 120 may be configured to receive the sensor data 114 generated by the sensor system(s) 104. In more detail, the sensor control system 120 can include a pixel evaluation component 122, an object location determination component 124, and/or a sensor system configuration determination component 126. For clarity, the sensor control system 120 (and its components) are illustrated separate from the sensor system(s) 104. However, portions of the sensor control system 120 may be implemented on the sensor system(s) 104. By way of non-limiting example, the processor(s) 106 may be configured to execute actions associated with the pixel evaluation component 122, the object location determination component 124, and/or the sensor system configuration determination component 126.

The pixel evaluation component 122 may be configured to determine reliability of data associated with individual pixels, e.g., to determine whether data associated with a pixel is "good" or "bad," reliable or unreliable, or otherwise. In at least one example, the pixel evaluation component 122 can determine whether pixels are saturated, e.g., from intensity information in the image frames 118. For instance, saturated pixels may have an intensity of 1 or an intensity that otherwise corresponds to a predetermined, e.g., maximum, value of the sensor. The pixel evaluation component 122 may also or alternatively use the phase frames 116 to determine the unreliable pixels. As noted above, the phase frames 116 can include phase values associated with the response carrier. The response carrier is expected to have properties or characteristics based on the shape of the carrier. In one example, the phase values associated with four phase frames should add to zero. Moreover, for four consecutively captured phase frames, the sum of (i) the difference between the third and the first phase values and (ii) the difference between the fourth and the second phase values should also equal zero. When the phase values for individual pixels do not conform to these properties, the pixel evaluation component 122 can identify the pixel as unreliable. The pixel evaluation component 122 can also look to the image frames 118 to determine whether pixels are reliable or not. In examples, the pixel evaluation component 122 can determine whether data associated with a pixel is inaccurate, e.g., because of an abundance of light received at the pixel. In some examples, the pixel can be indicated as saturated, e.g., as having an intensity over a threshold value. In other examples, however, the pixel may not be saturated, but may still be unreliable. For instance, the pixel may include two photon wells. In these examples, a difference between the number of photons in the wells can be associated with an intensity of the pixel. When both wells are saturated, the difference will be zero and the pixel will be readily identified as oversaturated or overexposed. However, when only one of the wells is oversaturated, a difference can be non-Loo Hay-zero, despite the measurement being unreliable. The pixel evaluation component 122 can also determine these unreliable pixels, e.g., by confirming that phase values of the phase frames follow certain rules.

Further detail about, and additional aspects of, determining unreliable and reliable pixels, as well as of controlling power in a sensor system based thereon, are detailed in U.S. patent application Ser. No. 16/550,156, entitled "Active Power Control of Sensors," filed Aug. 23, 2019. For example, techniques described therein may be implemented in connection with the functionality described herein. Without limitation, unreliable pixels may be determined in accordance with techniques descried in the '156 application in addition to or instead of the techniques described herein. The '156 application is hereby incorporated by reference in its entirety. Corresponding emitters may be determined based on the identified "bad" or "unreliable" pixels. In at least some examples, angles of reflection may be accounted for in determination of the associated emitters. In various examples, a Gaussian (or other) blurring may be applied to the intensities which border such identified emitters, such that there is a smooth transition between the intensities of proximate emitters and the intensity determined for those emitters associated with the "bad", "unreliable", saturated, or otherwise non-optimized image. Additional details are described below.

As noted above, objects in the environment 100 may have different reflective properties, and more highly-reflective objects, e.g., retroreflectors, can result in glare in the image data 100. Moreover, some less-reflective objects that are close to the sensor system(s) 104 can also result in image glare. In examples, glare may impact more than just the pixels associated with the highly reflective object. For instance, reflected light associated with glare may reflect and scatter in the lens of the sensor, causing other pixels to also become saturated and/or unreliable, e.g., in addition to those pixels corresponding to the object causing the glare. Techniques described herein can reduce glare by selectively reducing an illumination intensity of emitted light directed at a highly-reflective objects (and in some instances emitted light directed proximate such objects), e.g., without reducing an illumination intensity of emitted light directed at other portions of the field of view. For example, the sensor data 114 generated using the techniques described herein that reconfigure aspects of the emitter system 116 may better represent the environment and/or may have a higher associated confidence.

As illustrated in FIG. 1, the sensor control system 120 may also include the object location determination component 124. In more detail, the object location determination component 124 can determine a location of one or more objects in the field of view of the sensor system(s) 104 having the saturated pixels. For instance, the object location determination component 124 can receive the sensor data 114 and identify one or more objects from the image frames 118. More specifically, the presence and/or position of the object may be inferred from the presence of a group of unreliable, e.g., saturated, pixels. In other examples, the object(s) may be identified from the sensor data 114 as groups of pixels having the same intensity or same depth. In at least some examples, the object location determination component 124 can receive additional data and determine the presence and/or location of the objects from this information. Such additional data may be from one or more additional sensors, e.g., of the same or different modality. Also in examples, the additional data can be received from a perception system or other system associated with the vehicle 102. The vehicle 102 may include a perception system configured to generate a bounding box, classification data, or the like, e.g., from one or more sensor modalities, to indicate objects in the environment 100. Such information may be received by the sensor control system 120. In other examples, the vehicle 102 may also or alternatively include a planning system, a tracking system, or the like, which may include functionality to identify the existence and/or location of objects in the environment 100.

As noted, the object location determination component 124 can determine object location(s) in the field of view of the sensor system(s) 104 having the unreliable, e.g., saturated, pixels. In some examples, the object location determination component 124 may determine the position of the object in a frame of reference unique to the sensor data 114, e.g., instead of a global coordinate system.

The sensor control system 120 can also include the sensor system configuration determination component 126. Specifically, the sensor system configuration determination component 126 can receive pixel information generated by the pixel evaluation component 122 and/or object location information generated by the object location determination component 124 and determine whether to adjust settings of the sensor system(s) 104. By way of non-limiting example, the sensor system configuration determination component 126 can determine whether to alter the illumination intensity of light emitted by the emitter system 110. In at least some instances, the sensor system configuration determination component 126 can determine whether to reduce illumination intensity at regions proximate the location of object(s) determined by the object location determination component 124. For example, the sensor system configuration determination component 126 can determine to reduce illumination intensity proximate objects when the pixel evaluation component 122 indicates that pixels around that object are saturated and maintain the illumination intensity at other areas of the field of view. For instance, the illumination intensity may be decreased when at least one pixel of all pixels proximate the object are saturated or unreliable, a ratio of saturated/unreliable pixels to unsaturated/reliable pixels or total pixels proximate the object meets or exceeds a threshold ratio, a number of saturated/unreliable pixels meets or exceeds a predetermined number of saturated/unreliable pixels, or the like.

In some instances, the sensor system configuration determination component 126 may also use additional information to determine whether and how to reconfigure the sensor system(s) 104. By way of non-limiting example, the sensor system configuration determination component 126 can receive additional information, such as classification information, identification information, segmentation information, or the like which may provide additional detail about a detected object. In at least one example, the sensor system configuration determination component 126 can determine from such additional information that the object identified is a highly-reflective object, e.g., a street sign, a license plate, or other known highly-reflective object, and may determine to reduce the illumination intensity proximate that object, e.g., regardless of whether data associated with the object is deemed unreliable or saturated.

The sensor system configuration determination component 126 can also generate one or more emitter system configuration signals 128, e.g., to control aspects of the sensor system(s) 104 to implement the determined change in emitter system 110. For example, the emitter system configuration signal(s) 128 can instruct a change in voltage and/or current supplied to one or more emitters of the emitter system 110, a change in a projection system associated with the emitter system 110, and/or a change in an LCD or mask associated with the emitter system 110. As also illustrated in FIG. 1, the sensor control system 120 can output the emitter system configuration signal(s) 120 to the sensor system(s) 104, e.g., to the emitter system 110 and/or the receiver 112. The sensor system(s) 104 may then generate a next iteration of the sensor data 114 with the sensor system(s) 104 reconfigured according to the emitter system configuration signal(s) 126. As will be appreciated, dynamically changing illumination of one or more regions of a field of view of the sensor in accordance with techniques described herein can reduce the effects of glare in subsequent frames. In one example, by dynamically reducing illumination power at regions of a field of view of a time-of-flight sensor corresponding to certain objects, pixels in the sensor data that would be substantially completely saturated, e.g., because the objects are highly reflective and/or very close to the sensor, can be improved to reduce saturation, thereby allowing for better recognition of objects. This may be particularly useful in configurations in which the time-of-flight sensor is relied upon to sense objects in close proximity to a vehicle.

Figure 2:
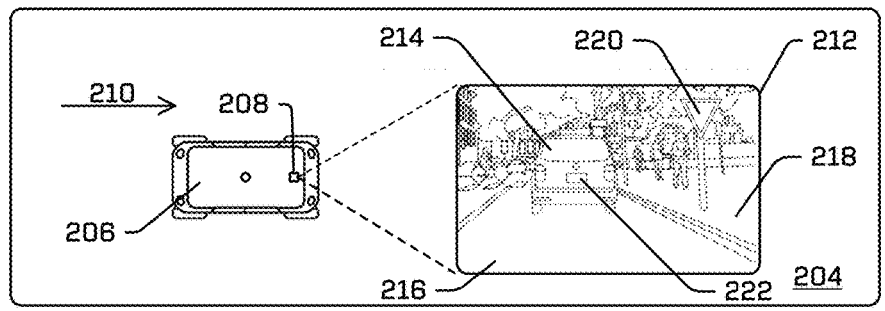
FIG. 2 includes textual and pictorial flowcharts of an example method for configuring a sensor, such as a time-of-flight sensor, to alter light emission to reduce glare, as described herein.
Figure 2:
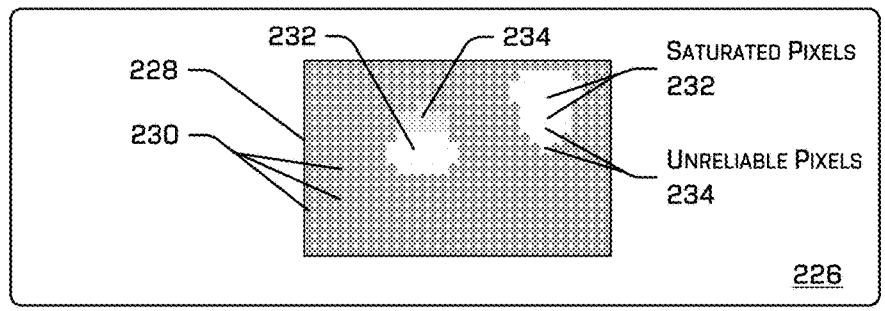
Figure 2:
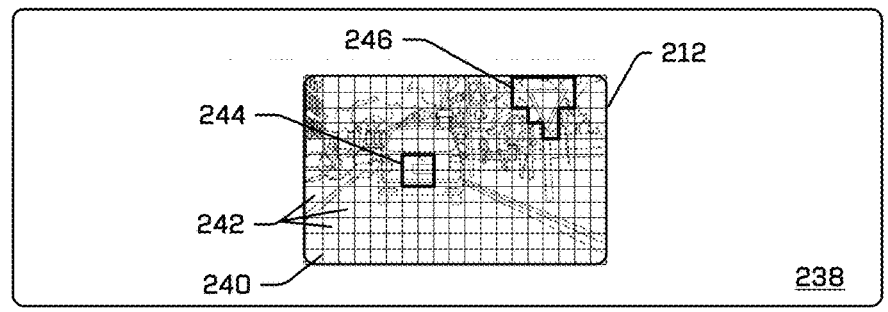
Figure 2:
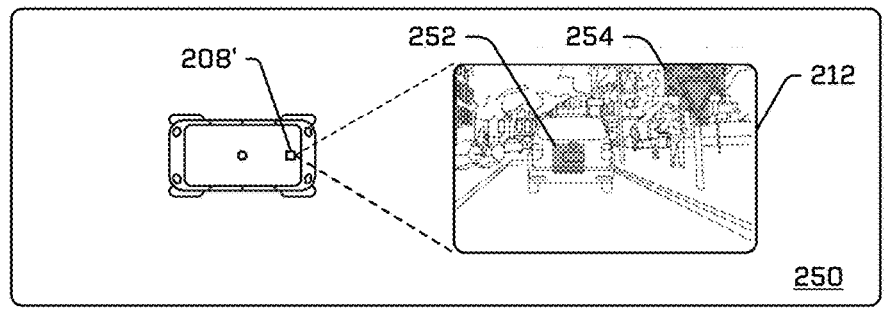

FIG. 2 includes textual and graphical flowcharts illustrative of a process 200 for correcting for glare, according to implementations of this disclosure. For example, the process 200 can be implemented using components and systems illustrated in FIG. 1 and described above, although the process 200 is not limited to being performed by such components and systems. Moreover, the components and systems of FIG. 1 are not limited to performing the process 200.

In more detail, the process 200 can include an operation 202 that includes receiving data from a time-of-flight sensor in a first configuration. As noted above, techniques described herein may be particularly applicable to use with time-of-flight sensors, and the example of FIG. 2 uses a time-of-flight sensor as one specific example. The disclosure is not limited to use with time-of-flight sensors, as techniques described herein may be applicable to other types of sensors that may be adversely affected by glare. In some examples, the operation 202 can include receiving both depth and intensity data measured by the time-of-flight sensor.

An example 204 accompanying the operation 202 illustrates a vehicle 206, which may be the vehicle 102 in some examples. A time-of-flight sensor 208 is mounted on the vehicle 206, e.g., to sense a portion of an environment surrounding the vehicle 206. For instance, the time-of-flight sensor 208 may be arranged to sense objects generally in a direction of travel 210 of the vehicle 206, although the sensor may be otherwise disposed and more sensors than the one illustrated may be present. In the illustrated embodiment, the time-of-flight sensor 208 is configured to image a field of view 212 corresponding to a region of an environment of the vehicle 206, which may be a portion of the environment 100. As illustrated, the field of view 212 can include a leading vehicle 214, a portion of a road 216 (on which the vehicle 206 is also travelling), a portion of a sidewalk 218 adjacent the road 216, and various other objects, including a road sign 220. As also illustrated, the leading vehicle 214 can include a license plate 222. As detailed further herein, the road sign 220 and the license plate 222 may be examples of highly-reflective objects that may result in glare at the time-of-flight sensor 208.

In the example 204, the time-of-flight sensor 208 may be configured to illuminate the field of view 212 with a constant illumination intensity. That is, the time-of-flight sensor 208 may emit a constant carrier signal across an entirety of the field of view 212.

At an operation 224, the process 200 may include identifying unreliable pixels. As detailed herein, unreliable pixels may include pixels that are oversaturated and/or unreliable because of the influence of glare. An example 226 accompanying the operation 224 provides a more detailed illustration. Specifically, the example 226 includes a visual representation 228 of the sensor data 228 received at the operation 202. The visual representation 228 includes an array of pixels 230 collectively representative of the field of view 212. The visual representation 228 may be representative of an intensity image, e.g., in which an intensity (e.g., brightness) of sensed objects in the scene is represented on a pixel-by-pixel basis. In the representation 228, relatively lighter of the pixels 230 may represent higher intensities, whereas relatively darker of the pixels 230 may represent lower intensities. In this example, some of the pixels 230 are white, representing saturated pixels 232. Other of the pixels 230, e.g., proximate the saturated pixels 232 may be near-white, and can represent unreliable pixels 234. The unreliable pixels 234 may include effects of glare, for instance, but may not be completely saturated. In some examples, the saturated pixels 232 and/or the unreliable pixels 234 may be identified as pixels having an intensity equal to or above a threshold, e.g., a relatively high threshold. Although the example 226 indicates both the saturated pixels 232 and the unreliable pixels 234, in examples, the saturated pixels 232 or the combination of the saturated pixels 232 and the unreliable pixels 234 may be identified at the operation 224.

In the representation 228, the saturated pixels 232 correspond generally to one of the road sign 220 or the license plate 222. As noted above, the road sign 220 and the license plate 222 may be examples of objects that are highly-reflective and thus may be a source for glare, which, in this example, can result in saturated and/or unreliable sensor data. Similarly, in the representation 228 the unreliable pixels 234 are proximate the saturated pixels 232, as the unreliable pixels 234 may be affected by glare that is causing saturation of the saturated pixels 232. Although in the representation 228 all of the pixels 230 that are not saturated pixels 232 or unreliable pixels 234 are indicated as having the same color (and thus the same intensity), this is for ease of illustration only. In actuality, the intensity at each of the pixels 230 (and therefore the color) will vary based on the object sensed in the environment.

At an operation 236, the process 200 may include identifying positions of objects in the field of view. For example, the operation 236 can include determining the location of the road sign 220 and the license plate 222 in the field of view 212. An example 238 accompanying the operation 236 shows the field of view 212 and a grid 240 superimposed over the field of view 212. The grid 240 includes an array of spaces 242 arranged in a number of rows and columns. In the example 238, the spaces 242 correspond in number and location with the number and location of the pixels 230. In other instances, and as detailed further herein, the number and arrangement of the spaces 242 may correspond to individually-controllable regions of the emitter system associated with the time-of-flight sensor 208.

The operation 236 may include determining a location of objects in the grid 240. More specifically, the operation 236 includes determining locations associated with objects, the reflection off of which is causing the saturated pixels 232. In the example of FIG. 2, the road sign 220 and the license plate 222 are the sources of pixel saturation. Accordingly, a first area 244, associated with the road sign 220, and a second area 246, associated with the license plate 222, are identified in the example 238. As shown, each of the first area 244 and the second area 246 includes a number of the spaces 242 of the grid 240, generally outlining the road sign 220 and the license plate 222, respectively.

The positions of the road sign 220 and the license plate 222 in the field of view may be determined in a number of ways. In some instances, the areas 244, 246 can be identified using the sensor data received at the operation 202. For instance, the areas 244, 246 may include all regions 242 of the grid 240 that include a saturated pixel 232. In other instances, regions 242 that include an unreliable pixel 234 may be used. Moreover, although the grid 240 is illustrated as including a number and arrangement of regions 242 corresponding to the number and arrangement of the pixels 230, in many examples this correspondence may not exist. In at least some instances, the number of pixels 230 may correspond to a number of pixels on a receiver, such as the receiver 112, whereas the grid 240 may include a number and arrangement of the regions 242 corresponding to a number and arrangement of discrete, e.g., controllable, portions of the emitter system, as described further herein. In these examples, several pixels 230 in the sensor data can correspond to a single one of the regions 242, and the operation 236 may include determining one of the regions 242 for inclusion in one of the areas 244, 246 based on a number of saturated pixels 230 corresponding to the region 242 being equal to or exceeding a threshold number, a number of unreliable pixels 232 corresponding to the region 242 being equal to or exceeding a threshold number, a ratio of saturated pixels 230 and/or of saturated pixels 230 and unreliable pixels 232 to a total number of pixels in the region 242 being equal to or exceeding a threshold ratio, and/or other factors. Moreover, the sensor data received at the operation 202 can include depth information, and the operation 236 can use this depth information to determine presence of an object.

In other examples, other data may be used to determine the presence and/or position of objects that may cause glare, such as the road sign 220 and/or the license plate 222. For example, sensor data from one or more sensors and/or sensor modalities different from the time-of-flight sensor 208 can be used to identify objects. The vehicle 206 can include additional sensors, including but not limited to imaging sensors, LiDAR sensors, radar sensors, or the like, and data from those sensors can be used to determine the presence of the road sign 220 and/or the license plate 222. In at least some examples, the vehicle 206 can include functionality to identify objects in image data, e.g., using image processing, segmentation, classification, and/or other techniques, and the operation 236 may map positions of objects detected using such techniques into the field of view 212 and/or the grid 240.

At an operation 248, the process 200 may include reconfiguring the sensor to reduce illumination intensity proximate the objects. For example, and as described further herein, the time-of-flight sensor 208 can include an emitter system that allows for selective illumination of portions of the field of view 212. For example, the time-of-flight sensor 208 can include an array of individually addressable light emitters, a projection system, and/or a configurable mask that allows for different illumination intensities. The operation 248 includes reconfiguring the emitter system to reduce illumination proximate the areas 244, 246 identified as including highly-reflective objects.

An example 250 accompanying the operation 248 illustrates a reconfigured sensor 208' illuminating the field of view 212. As illustrated, an area 252 corresponding to the first area 244 and an area 254 corresponding to the second area 246 are grayed out relative to the remainder of the field of view 212. In the example, the reconfigured time-of-flight sensor 208' has been controlled to reduce the illumination intensity at the areas 252 relative to the remainder of the field of view 212. By reducing the illumination intensity in this manner, a next iteration of sensor data generated by the time-of-flight sensor 208 may have a reduced number of saturated pixels proximate the first area 244 and the second area 246, because less light has been directed at the road sign 220 and the license plate 222, and thus less return light will be received at the receiver. Reducing glare from these highly-reflective objects also may reduce the number of unreliable pixels 234 in subsequent iterations of the sensor data.

Figure 3:
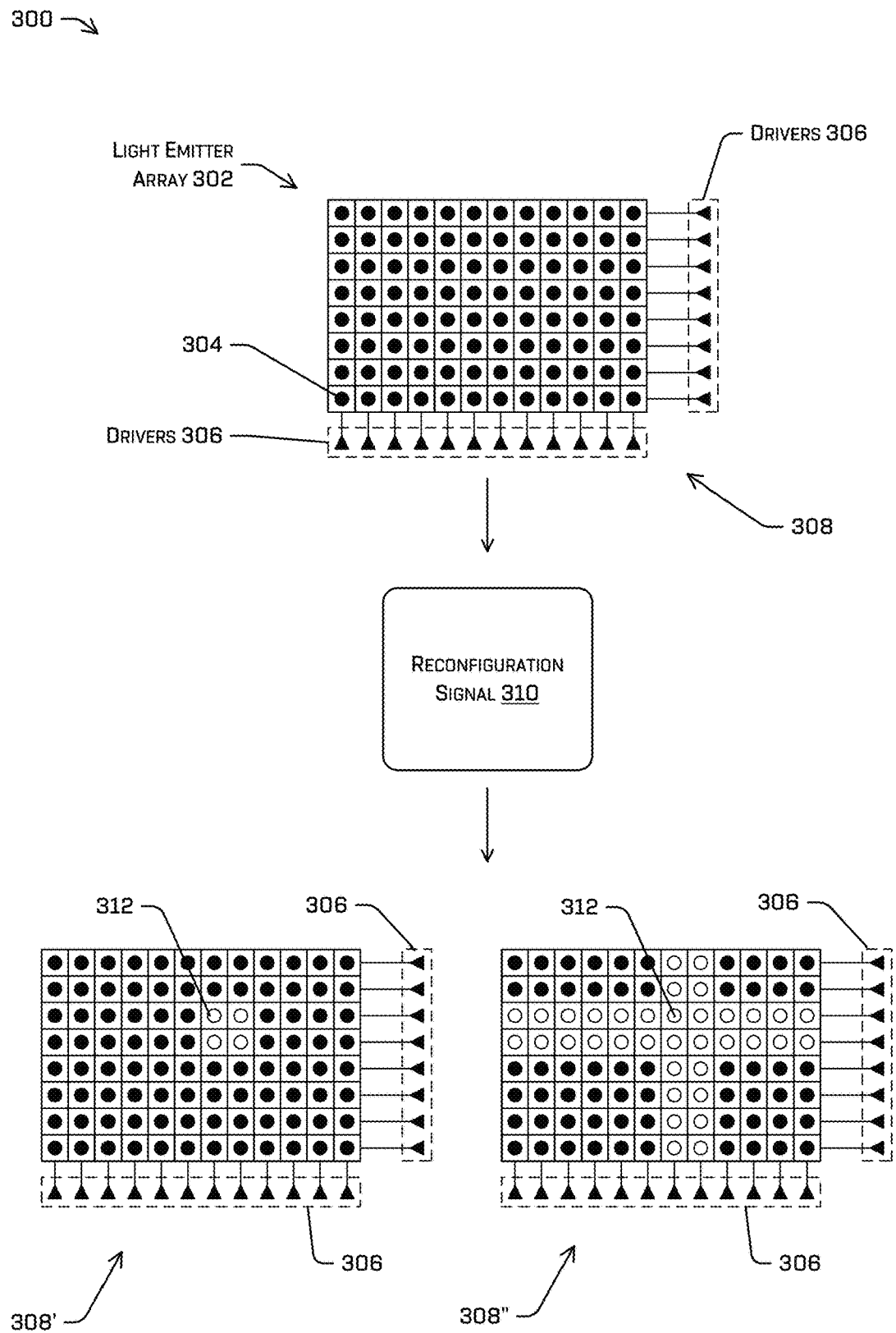
FIG. 3 illustrates aspects of an example sensor system and configurations thereof for altering illumination of a scene, as described herein.
Figure 4:
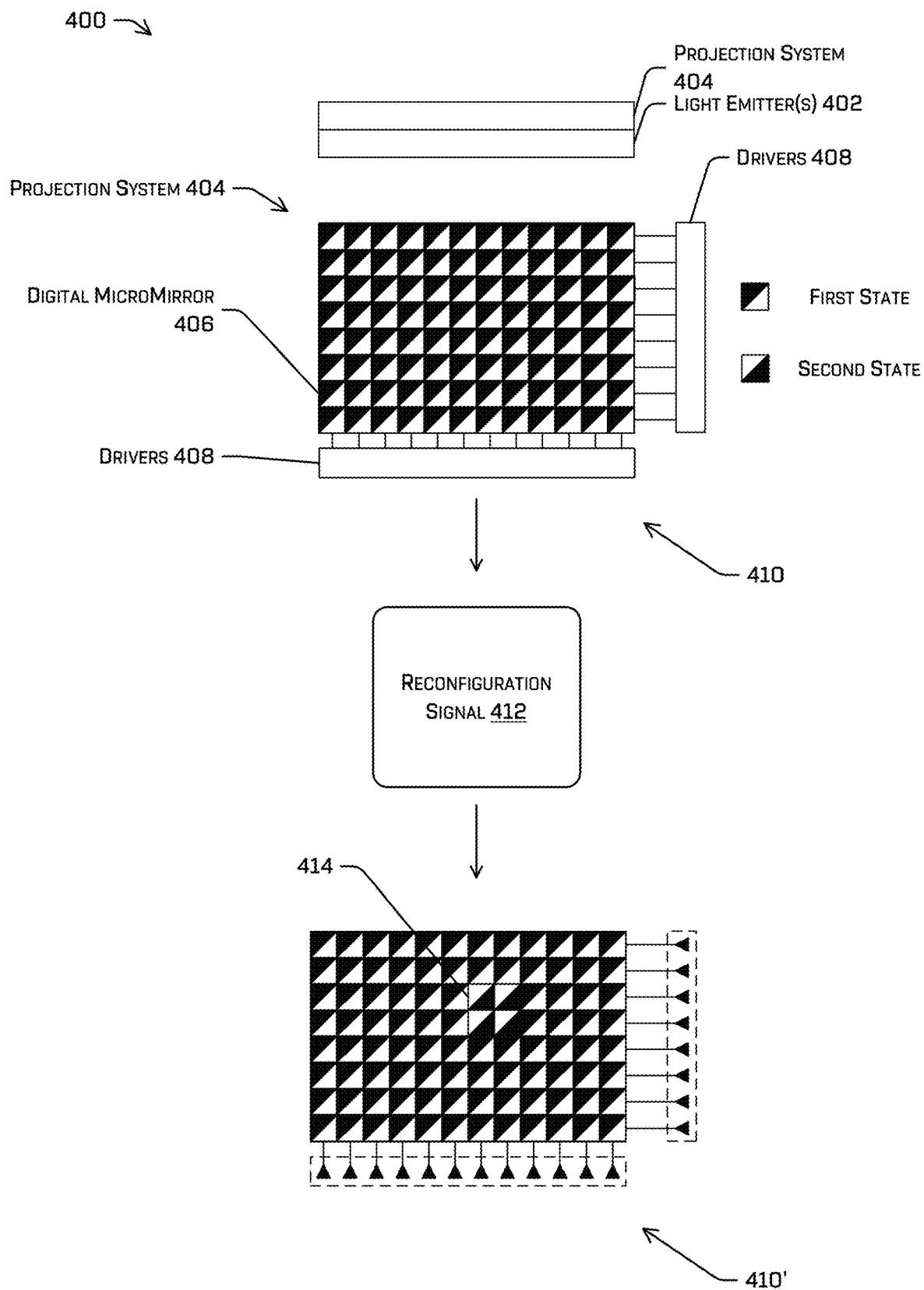
FIG. 4 illustrates aspects of another example sensor system and configurations thereof for altering illumination of a scene, as described herein.
Figure 5:
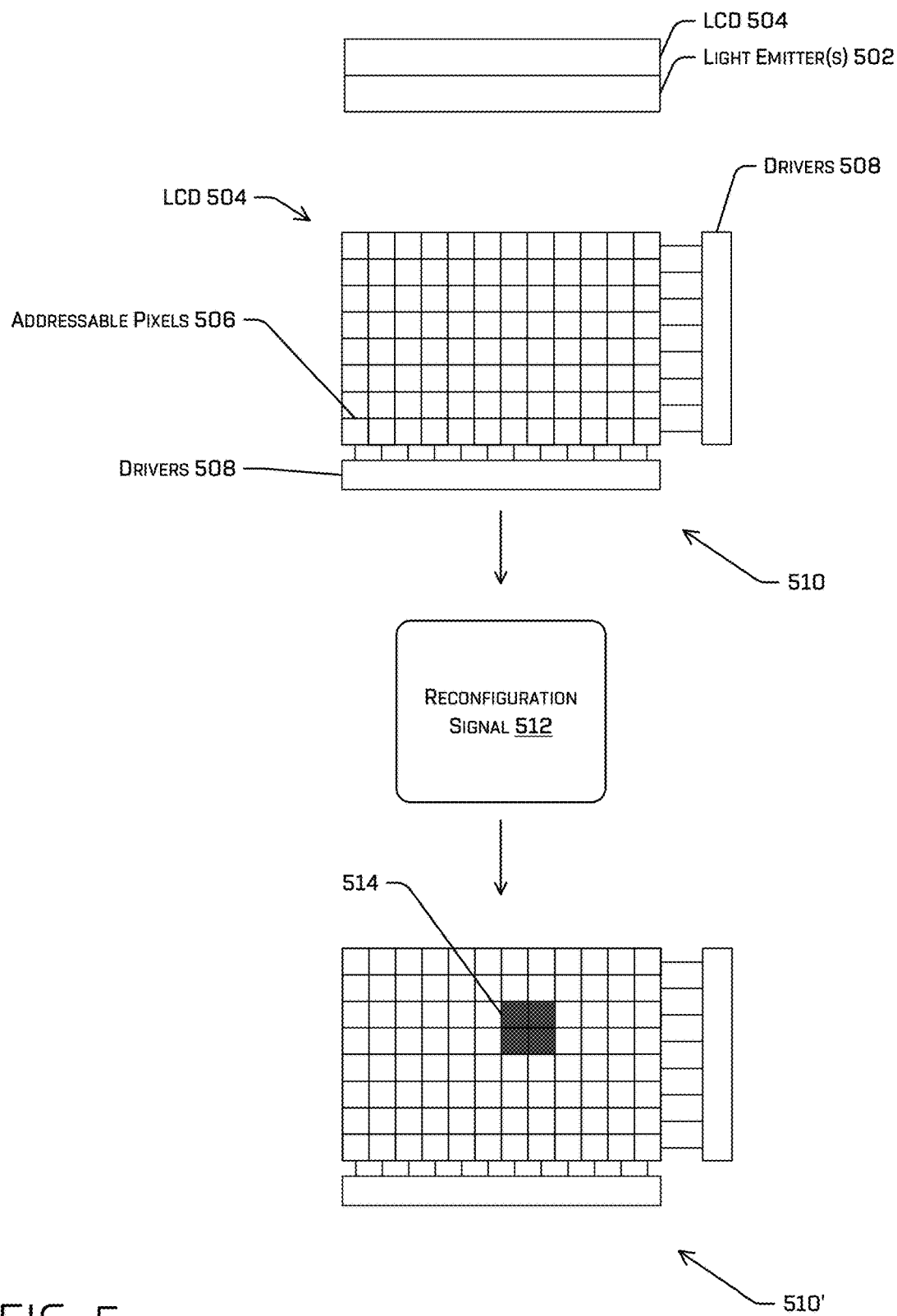
FIG. 5 illustrates aspects of yet another example sensor system and configurations thereof for altering illumination of a scene, as described herein.

As detailed herein, aspects of this disclosure include reducing the effects of glare by selectively altering the illumination of regions of a field of view. Accordingly, as in the example 250, one or more portions of a field of view may be illuminated at a first intensity while other portions may be illuminated at a second intensity. FIGS. 3-5 illustrate systems, and functionality of those systems, used to accomplish this selective illumination.

More specifically, FIG. 3 illustrates an emitter system 300, which may be a part of a sensor system, such as a time-of-flight sensor system. The emitter system 300 may be an example of the emitter system 110, which may form a part of the sensor system(s) 104. In more detail, the emitter system 300 includes a light emitter array 302 including a plurality of individual light emitters 304. In examples, the light emitters 304 may be vertical cavity surface emitting lasers (VCSELs), although the light emitters may be other types of light sources, including but not limited to light emitting diodes (LEDs), laser emitters, or the like. Although the light emitter array 302 is illustrated as including eight rows and twelve columns, more or fewer rows and/or columns of light emitters 304 may be used. Moreover, this disclosure is not limited to an array including rows and columns. The light emitter array 302 may take different configurations. As also illustrated schematically in FIG. 3, the emitter system 300 includes a number of drivers 306. The drivers 306 may be configured to signal the light emitters 304 to emit light therefrom. In some examples, the drivers 306 may control the light emitters 304 in a binary manner, e.g., such that the light emitters 304 are either on or off. In other instances, the drivers 306 can increase or decrease the amount of light emitted by the light emitters 304 within a range, e.g., by altering an applied voltage or current.

In the example of FIG. 3, the light emitter array 302 is shown in a first configuration 308, in which each of the light emitters 304 is configured in the same manner. Accordingly, the light emitter array 302 will provide substantially constant illumination across a field of view of the sensor including the emitter system 302. As also shown in FIG. 3, the light emitter array 302 may receive a reconfiguration signal 310. For example, the reconfiguration signal 310 can be one of the emitter system configuration signals 128 discussed above.

In response to the reconfiguration signal, the drivers 306 may control the light emitter array 302 to alter an emission from one or more of the light emitters 304. For example, the reconfiguration signal may be generated in response to determining an area in the field of view of the sensor for which sensor returns are saturated and/or in which a highly-reflective object is detected, e.g., as described in connection with FIG. 2. In the example of FIG. 3, the object may be located in the field of view such that the light emitters 304 directly above and to the right of a center of the light emitter array 302 illuminate the object. In this example, the reconfiguration signal may cause the drivers 306 to reconfigure the light emitter array 302 in a second configuration 308'. In the second configuration 308', four of the light emitters 304 are shown as reconfigured light emitters 312 (e.g., as hollow circles). The reconfigured light emitters 312 may have a reduced illumination intensity relative to the other light emitters 304 in the light emitter array 302 (and relative to the illumination intensity of those emitters in the first configuration). In this example, the reconfigured light emitters 304' may be aligned such that a carrier signal therefrom is directed at a highly-reflective object. By reducing the illumination intensity from the reconfigured light emitters 312, the reflected light from that object will be reduced, thereby reducing the likelihood of saturation at pixels receiving the reflected light.

In the second configuration 308', the reconfigured light emitters 304' include only four light emitters 304, e.g., because those light emitters have been determined as directly illuminating an object causing glare. However, altering the illumination intensity of the four light emitters 304 as shown may require that each of the light emitters 304 be individually addressable. However, the use of individually addressable pixels requires that the number of drivers 306 corresponds to the number of light emitters 304 in the light emitter array 302. While driving the light emitters 304 in this manner may be relatively precise, it may also be computationally and/or power intensive. Accordingly, some instances may implement the reconfiguration signal differently.

FIG. 3 also illustrates the light emitter array 302 in a third configuration 308". In the third configuration 308", each the drivers 306 is configured to control an entire row or entire column of the light emitter array. Accordingly, in addition to reconfiguring the four reconfigured pixels 312 as in the second configuration 308', the third configuration 308" reconfigures all light emitters 304 in the rows and columns associated with those reconfigured light emitters 312. While it may be desirable to reduce only illumination intensity at the four light emitters 304 shown as reconfigured light emitters 312 in the second configuration 308', driving entire rows and columns with the drivers 306 can drastically reduce the number of drivers 306 required by the emitter system 302, e.g., from a driver for each light emitter 304 to a driver for each row and column.

In other examples, the emitter system 300 can include more than one of the light emitter array 302. For instance, the emitter system 300 can include two instances of the light emitter array 302, e.g., a first light emitter array and a second light emitter array. The first light emitter array and the second light emitter array may be configured such that corresponding pixels in the light emitter arrays illuminate the same region of the field of view. In some instances, the first light emitter array may be configured to be driven on a per-row basis and the second light emitter array may be configured to be driven on a per-column basis. Thus, this example may include the same number of drivers 306 as used to obtain the third configuration 308", but spread across two emitters. As a result, the third configuration 308" may be obtained by turning off the two rows of emitters in the first light emitter array and the two columns of emitters in the second light emitter array. As a result, locations in the field of view corresponding to the rows turned off in the first light emitter array will be illuminated by light emitters in the second array, except for locations the area corresponding to the four light emitters (e.g., at the emitters identified as the reconfigured light emitters 312 in FIG. 3) as those pixels will be turned off in both the first and second light emitter arrays. Similarly, locations in the field of view corresponding to the columns turned off in the second light emitter array will be illuminated by light emitters in the first light emitter array, again, except for those locations corresponding to the emitters identified as the reconfigured light emitters.

As will be appreciated, in this example modification, since two light emitter arrays are used, the illumination in the field of view may vary between off and on. For instance, assuming all emitters are configurable in a binary "on" or "off," those areas corresponding to the rows of the first emitter that are "off" and those areas corresponding to the columns of the second emitter that are "off" will not be illuminated (e.g., at the overlap of the rows and columns) or will be illuminated only by an emitter in the other light emitter array. Thus, areas of the field of view are illuminated at one of three illumination intensities when two light emitter arrays are used. The foregoing modification is for example only. In other examples, the emitter system 300 could include any number of light emitters differently driven, to accomplish different illumination patterns. Moreover, although the light emitters are described and illustrated as being "on" or "off," in other examples the light emitters 302 may be configured to emit light at configurable illumination intensities. Thus, for example, instead of providing no illumination from the reconfigured light emitters 312, the illumination may instead be reduced to a non-zero intensity.

The second configuration 308' and the third configuration 308", as well as modifications to the third configuration discussed above, are examples only. Other implementations also are contemplated. For instance, drivers may be provided to control different subsets of pixels than the rows/columns. In some examples, each of the drivers 306 may control a diagonal line of light emitters 304 or a sub-array, e.g., a 2×2 or 3×3 array, of the light emitters 304. Moreover, in those examples, the drivers may control differing subsets of light emitters 304 across multiple light emitting arrays 302, as in the modification discussed above. Additional drivers and/or additional light emitter arrays may increase costs associated with the emitter system 300 but may also provide greater flexibility for more precise illumination control.

FIG. 4 illustrates another emitter system 400 that may be used to implement aspects of this disclosure. As shown, the emitter system 400 includes one or more light emitter(s) 402 and a projection system 404 configured to alter light output by the light emitter(s) 402. The light emitter(s) 402 may include any light source(s) capable of illuminating a field of view. The projection system 404 is arranged between the light emitter(s) 402 and the environment to be illuminated and may be selectively controlled to affect light passing therethrough. Although the light emitter(s) 402 and the projection system 404 are illustrated as stacked components, this arrangement is for example only. In implementations, the light emitter(s) 402 and the projection system 404 may be otherwise associated, e.g., as one or more integrated units.

In more detail, the projection system 404 includes an array of digital micromirror devices 406, arranged in columns and rows. The digital micromirror devices 406 are onto-electromechanical devices that include a mirror or similar reflective surface configurable in multiple positions, as described further herein. Although the projection system 404 is illustrated as including eight rows and twelve columns of digital micromirror devices 406, more or fewer rows and/or columns of the devices 406 may be used. Moreover, this disclosure is not limited to an array including rows and columns. The projection system 404 may take different configurations.

The digital micromirror devices 406 may be configurable in a first state that allows substantially all light generated by the light emitter(s) 402 to pass therethrough and in at least one second state that reroutes, e.g., reflects, at least some of the light emitted by the light emitter(s) 402. In the at least one second state, the digital micromirror devices 406 may redirect light away from the environment, e.g., to a heatsink. In practice, the first and second states may be obtained by moving a mirror in the digital micromirror devices 406 between a first position and a second position. As also illustrated schematically in FIG. 4, the emitter system 400 includes a number of drivers 408, which may configure the micromirror devices 406 in the first state or the second state(s).

Individual of the digital micromirror devices 406 may be configurable in the first state or the second state, independently, to provide different configurations for the projection system 404. FIG. 4 illustrates the states differently in the schematic representation of the projection system 404. In a first configuration 410 of the projection system 404, each of the digital micromirror devices 406 is arranged in the first state. In the first configuration 410, light from the light emitter(s) 402 is substantially unobstructed by the digital micromirror devices 406. Accordingly, in the first configuration 410, the emitter system 400 generally results in uniform illumination of a field of view of the environment of a sensor including the emitter system 400. The first configuration 410 may generally result in illumination similar to or the same as the first configuration 308 of the emitter system 300 shown in FIG. 3.

Also like in the example shown in FIG. 3, the projection system 404 may receive a reconfiguration signal 412. For example, the reconfiguration signal 412 can be similar to the reconfiguration signal 310 and/or one of the emitter system configuration signals 128 discussed above. In response to the reconfiguration signal, the drivers 408 may control one or more of the digital micromirror devices 406 to alter an emission from the light emitter(s) 402. For example, the reconfiguration signal may be generated in response to determining an area in the field of view of the sensor for which sensor returns are saturated and/or in which a highly-reflective object is detected, e.g., as described in connection with FIG. 2. In the example of FIG. 4, the object may be located in the field of view such that light passing through the digital micromirror devices 406 directly above and to the right of a center of the projection system 404 illuminate the object. In this example, the reconfiguration signal may cause the drivers 408 to reconfigure the projection system 404 in a second configuration 410'. In the second configuration 410', four of the digital micromirror devices 406 are shown as reconfigured digital micromirror devices 414. Specifically, the reconfigured digital micromirror devices 414 are digital micromirror devices 406 that have been configured in the second state. The reconfigured micromirror devices 414 will result in a reduced illumination intensity for light passing therethrough, relative to the micromirror devices 406 in the first state (and relative to the illumination intensity passing through the devices in the first configuration 410). In this example, the reconfigured digital micromirror devices 414 may be selected because light emitted therefrom may be directed at a highly-reflective object. By reducing the illumination intensity of light passing through the reconfigured digital micromirror devices, the reflected light from that object will be reduced, thereby reducing the likelihood of saturation at pixels receiving the reflected light.

FIG. 5 illustrates another emitter system 500 that may be used to implement aspects of this disclosure. As shown, the emitter system 500 includes one or more light emitter(s) 502 and a liquid crystal display (LCD) 504 configured to alter light output by the light emitter(s) 502. The light emitter(s) 502 may include any light source(s) capable of illuminating a field of view. The LCD 504 is arranged between the light emitter(s) 502 and the environment to be illuminated and may be selectively controlled to affect light passing therethrough, as described herein. Although the light emitter(s) 502 and the projection system 504 are illustrated as stacked components, this arrangement is for example only. In implementations, the light emitter(s) 502 and the LCD 504 may be otherwise associated, e.g., as one or more integrated units.

In more detail, the LCD 504 includes an array of addressable pixels 506, arranged in columns and rows. The addressable pixels 506 are regions of a substrate that have an adjustable opacity, as described further herein. Although the LCD 504 is illustrated as including eight rows and twelve columns of addressable pixels 506, more or fewer rows and/or columns of the pixels 506 may be used. Moreover, this disclosure is not limited to an array including rows and columns. The LCD 504 may take different configurations.

The addressable pixels 506 may be configurable in a first state that allows substantially all light generated by the light emitter(s) 502 to pass therethrough (e.g., a substantially transparent state) and in at least one second state with an increased opacity. In the second state at least some of the light emitted by the light emitter(s) 504 may be blocked by the pixel 506, and in some instances, the pixels 506 may be completely opaque in the second state. As also illustrated schematically in FIG. 5, the emitter system 500 includes a number of drivers 508, which may configure the addressable pixels 506 in the first state or the second state(s).

Individual of the addressable pixels 506 may be configurable in the first state or the second state, independently, to provide different configurations for the projection system LCD 504. In the illustrated example, a first configuration 510 of the LCD 504, each of the addressable pixels 506 is arranged in the first, e.g., transparent state. In the first configuration 410, light from the light emitter(s) 502 is substantially unobstructed by the addressable pixels 506. Accordingly, in the first configuration 510, the emitter system 500 generally results in uniform illumination of a field of view of the environment of a sensor including the emitter system 500. The first configuration 510 may generally result in illumination similar to or the same as the first configuration 308 of the emitter system 300 shown in FIG. 3 and/or the first configuration 410 of the emitter system 400 shown in FIG. 4.

Also like in the examples shown in FIGS. 3 and 4, the LCD 504 may receive a reconfiguration signal 512. For example, the reconfiguration signal 512 can be similar to the reconfiguration signal 310, the reconfiguration signal 412, and/or one of the emitter system configuration signals 128 discussed above. In response to the reconfiguration signal 512, the drivers 508 may control one or more of the addressable pixels 506 to alter an emission from the light emitter(s) 502. For example, the reconfiguration signal 512 may be generated in response to determining an area in the field of view of the sensor for which sensor returns are saturated and/or in which a highly-reflective object is detected, e.g., as described in connection with FIG. 2. In the example of FIG. 5, the object may be located in the field of view such that light passing through the addressable pixels 506 directly above and to the right of a center of the LCD 504 illuminate the object. In this example, the reconfiguration signal 512 may cause the drivers 508 to reconfigure the LCD 504 in a second configuration 510'. In the second configuration 510', four of the addressable pixels 506 are shown as reconfigured pixels 514. Specifically, the reconfigured pixels 514 are addressable pixels 506 that have been configured in the second state. The reconfigured pixels 514 will result in a reduced illumination intensity for light passing therethrough, relative to the addressable pixels 506 in the first state (and relative to the illumination intensity passing through the reconfigured pixels 514 in the first configuration 510). In this example, the reconfigured pixels 514 may be selected because light emitted therefrom may be directed at a highly-reflective object. By reducing the illumination intensity of light passing through the reconfigured pixels 514, an intensity of the returning light reflected from that object will be reduced, thereby reducing the likelihood of saturation at pixels receiving the reflected light.

As will be appreciated, the emitter systems 300, 400, 500 will each provide a similar outcome. Specifically, each system allows for a reduction in illumination intensity at specific regions of the field of view of the sensor using the system. As detailed herein, reducing the illumination intensity proximate objects that cause glare or may cause glare can result in improved sensor data, e.g., by reducing a likelihood of pixel saturation at a receiver of the device. While each of the examples describes reducing an illumination intensity, the systems 300, 400, 500 described herein may also be used to increase an illumination intensity. For instance, when the highly-reflective object moves within the field of view, or exits the field of view entirely, the systems 300, 400, 500, can be configured to increase the illumination intensity, e.g., by returning to the first configurations 308, 410, 510. Techniques described herein also may be used to increase the illumination intensity for other purposes, including to image more distant objects and/or less reflective objects. Dynamic illumination of a field of view on a region-by-region basis can provide improved sensor data in other applications as well.

Figure 6:
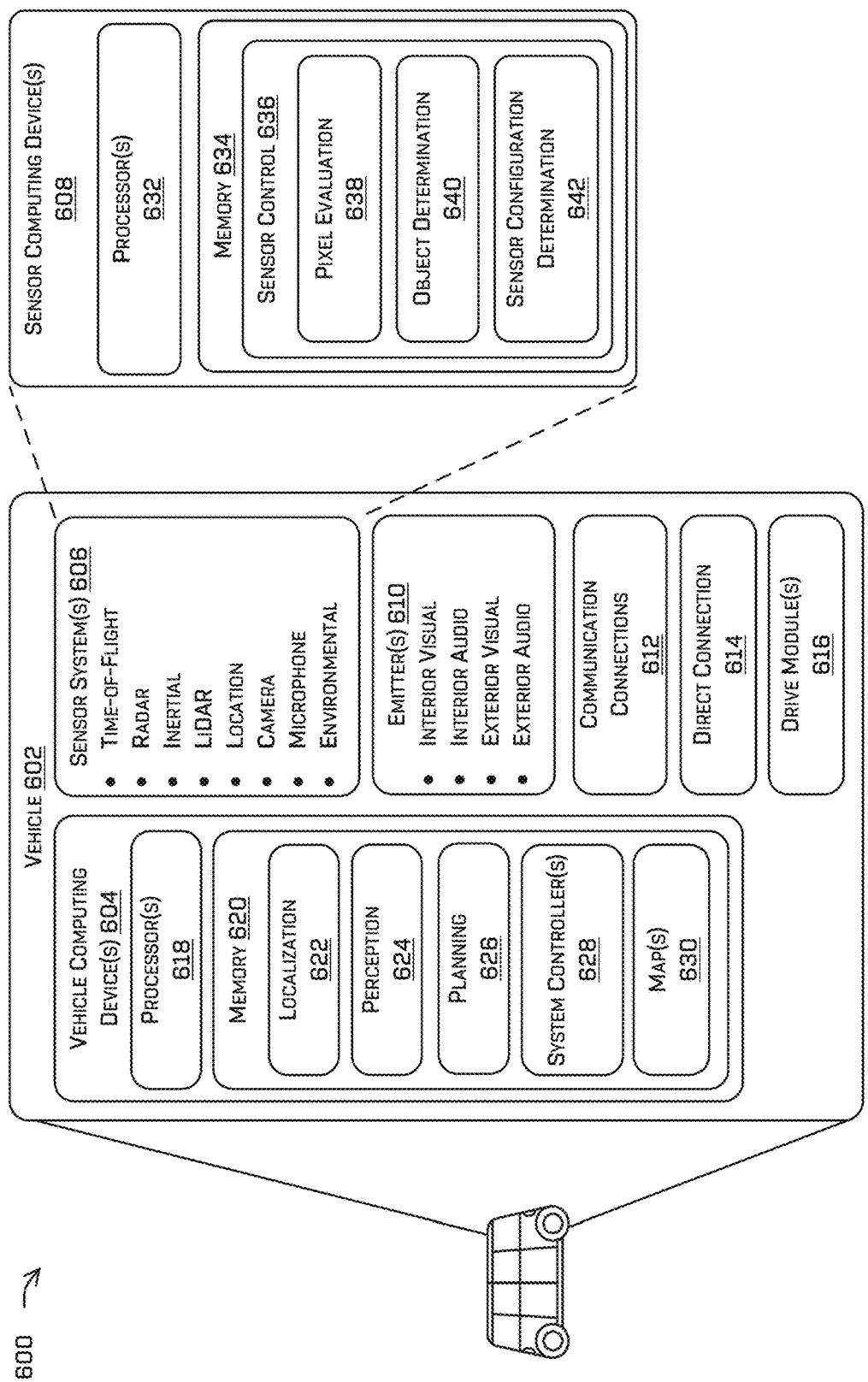
FIG. 6 depicts a block diagram of an example computing system for correcting sensor data to reduce inaccuracies caused by glare, as described herein.

FIG. 6 depicts a block diagram of an example system 600 for implementing the techniques discussed herein. In at least one example, the system 600 can include a vehicle 602, which can be similar to (or the same as) the vehicle 102 described above with reference to FIG. 1. In the illustrated example 600, the vehicle 602 is an autonomous vehicle; however, the vehicle 602 can be any other type of vehicle. Moreover, although implementations of this disclosure are discussed in the context of vehicles, techniques described herein may be applicable to other sensor use cases, including those not associated with vehicles.

The vehicle 602 can include one or more vehicle computing devices 604, one or more sensor systems 606, which may include one or more sensor computing devices 608, one or more emitter(s) 610, one or more communication connections 612, at least one direct connection 614 (e.g., for physically coupling with the vehicle 602 to exchange data and/or to provide power), and one or more drive modules 616. In some instances, the vehicle 602 can include more or fewer instances of the vehicle computing device(s) 604. The sensor system(s) 606 can be configured to capture sensor data associated with an environment. In examples, the sensor system(s) 606 can include the sensor system(s) 104 and/or the time-of-flight sensor(s) 208.

The vehicle computing device(s) 604 can include one or more processors 618 and memory 620 communicatively coupled with the one or more processors 618. In at least one instance, the processor(s) 618 can be similar to the processor(s) 106 and the memory 620 can be similar to the memory 108 described above with reference to FIG. 1. In the illustrated example, the memory 620 of the vehicle computing device(s) 604 stores a localization component 622, a perception component 624, a planning component 626, one or more system controllers 628, and one or more maps 630. Though depicted as residing in the memory 620 for illustrative purposes, it is contemplated that the localization component 622, the perception component 624, the planning component 626, the system controller(s) 628, and/or the map(s) 630 can additionally, or alternatively, be accessible to the vehicle computing device(s) 604 (e.g., stored in a different component of vehicle 602 and/or stored remotely).

In at least one example, the localization component 622 can include functionality to receive data from the sensor system(s) 606 to determine a position of the vehicle 602. In instances described herein, in which the sensor system(s) 606 include a time-of-flight sensor, the localization component 622 can receive data generated upon reconfiguration of the time-of-flight sensor, e.g., to reduce glare in the time-of-flight sensor data. In other implementations, the localization component 622 can include and/or request/receive a three-dimensional map, e.g., of the map(s) 630, of an environment and can continuously determine a location of the autonomous vehicle within the map. In some instances, the localization component 622 can use SLAM (simultaneous localization and mapping) or CLAMS (calibration, localization and mapping, simultaneously) to receive image data, such as from the time-of-flight sensor, LiDAR data, RADAR data, SONAR data, IMU data, GPS data, wheel encoder data, or any combination thereof, and the like to accurately determine a location of the autonomous vehicle 602. In some instances, the localization component 622 can provide data to various components of the vehicle 602 to determine an initial position of an autonomous vehicle for generating a candidate trajectory, as discussed herein. The localization component 622 may also determine, e.g., from the map(s) 630, a location of objects known to be in the environment, such as road signs, including the road sign 220 discussed above.

In some examples, the perception component 624 can include functionality to perform object detection, segmentation, and/or classification. In some instances, the perception component 624 can receive data, which may include time-of-flight sensor data, and generate processed sensor data that indicates a presence of an object in the environment of, e.g., proximate, the vehicle 602 and/or a classification of the object as an object type (e.g., highly-reflective object, car, pedestrian, cyclist, building, tree, road surface, curb, sidewalk, unknown, etc.). In additional and/or alternative examples, the perception component 624 can provide processed sensor data that indicates one or more characteristics associated with a detected object and/or the environment in which the object is positioned. In some examples, characteristics associated with an object can include, but are not limited to, an x-position (global position), a y-position (global position), a z-position (global position), an orientation, an object type (e.g., a classification), a velocity of the object, an extent of the object (size), or the like. Characteristics associated with the environment can include, but are not limited to, a presence of another object in the environment, a state of another object in the environment, a time of day, a day of a week, a season, a weather condition, an indication of darkness/light, etc. In the context of examples described herein, the perception component 624 can perform some or all of the functionality ascribed to the object location determination component 124, such as determining the presence and location of highly-reflective objects.

In some instances, the planning component 626 can determine a path for the vehicle 602 to follow to traverse through an environment. For example, the planning component 626 can determine various routes and trajectories and various levels of detail. In some examples, the planning component 626 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 626 can generate an instruction for guiding the autonomous vehicle along at least a portion of the route from the first location to the second location. In at least one example, the planning component 626 can determine how to guide the autonomous vehicle from a first waypoint in the sequence of waypoints to a second waypoint in the sequence of waypoints. In some examples, the instruction can be a trajectory, or a portion of a trajectory. In some instances, multiple trajectories can be substantially simultaneously generated (i.e., within technical tolerances) in accordance with a receding horizon technique. A single trajectory of the multiple trajectories in a receding horizon having the highest confidence level may be selected to operate the vehicle.

In other examples, the planning component 626 can alternatively, or additionally, use data from the perception component 624 to determine a path for the vehicle 602 to follow to traverse through an environment. For example, the planning component 626 can receive data from the perception component 624 regarding objects associated with an environment. Using this data, the planning component 626 can determine a route to travel from a first location (e.g., a current location) to a second location (e.g., a target location) to avoid objects in an environment.

As noted above, the vehicle computing device(s) 604 can include the system controller(s) 628, which can be configured to control steering, propulsion, braking, safety systems, emitters, communication systems, and/or other systems of the vehicle 602. The system controller(s) 628 can communicate with and/or control corresponding systems of the drive module(s) 616 and/or other components of the vehicle 602, which may be configured to operate in accordance with a trajectory provided from the planning component 626.

In some examples, the map(s) 630 can be stored on a remote computing device. In some examples, multiple maps 630 can be stored based on, for example, a characteristic (e.g., type of entity, time of day, day of week, season of the year, etc.). Storing multiple maps 630 can have similar memory requirements but increase the speed at which data in a map can be accessed. As noted above, the map(s) 630 may be accessed to identify the presence and location of objects, such as highly-reflective objects, in an environment of the vehicle 602. Using such map(s) 630, techniques described herein may perform a reconfiguration of the emitter system 110, e.g., in some instances in the absence of receiving information about unreliable or saturated pixels.

In at least one example, the sensor system(s) 606 can be similar to the sensor system(s) 104 described above with reference to FIG. 1. For instance, and although not illustrated in FIG. 6, the sensor system(s) 606 can include an emitter system like one or more of the emitter systems 110, 300, 400, 500, described herein. The sensor system(s) 606 may include time-of-flight sensors, such as the time-of-flight sensor 208, location sensors (e.g., GPS, compass, etc.), inertial sensors (e.g., inertial measurement units (IMUs), accelerometers, magnetometers, gyroscopes, etc.), LIDAR sensors, RADAR sensors, SONAR sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The sensor system(s) 606 can include multiple instances of each of these or other types of sensors. For instance, the time-of-flight sensors can include individual time-of-flight sensors located at the corners, front, back, sides, and/or top of the vehicle 602. As another example, the camera sensors can include multiple cameras disposed at various locations about the exterior and/or interior of the vehicle 602. The sensor system(s) 606 can provide input to the vehicle computing device(s) 604.

The sensor system(s) 606 can include the sensor computing device(s) 608, which can include one or more processors 632 and memory 634 communicatively coupled with the one or more processors 632. The one or more processors 632 can be similar to the processor(s) 106 and/or to the processor(s) 618, described above. The memory 634 can be similar to the memory 108 and/or to the memory 620, described above. In the illustrated example, the memory 634 of the sensor computing device(s) 608 can store a sensor control system 636, which can include a pixel evaluation component 638, an object determination component 640, and a sensor configuration determination component 642. Though depicted as residing in the memory 634 for illustrative purposes, it is contemplated that the sensor control system 636 (as well as its associated components) can additionally, or alternatively, be accessible to the sensor system(s) 606 (e.g., stored in a different component of vehicle 602 and/or stored remotely). Moreover, although the sensor control system 636 (as well as its associated components) is illustrated as being stored in and/or part of the sensor computing device(s) 608, in other implementations any or all of these components may be stored in the memory 620 and/or in some other, not illustrated memory, such as a remote memory associated with a remote computing device. That is, although FIG. 6 illustrates several components as being part of the sensor computing device(s) 608 of the sensor system(s) 606, the processing associated with any or all of those components may be performed other than at the sensor. In one example, the sensor system(s) 606 may output raw data, e.g., the quadrature data discussed above, for processing in accordance with functionality ascribed herein to one or more of the pixel evaluation component 638, the object determination component 640, and/or the sensor configuration determination component 642, but that processing may be performed other than at the location of the emitter and the receiver. Without limitation, the sensor system(s) 606 can include on-board processing capabilities to perform any or all functionality described herein and associated with dynamic control of an emitting system, e.g., to reduce the impacts of glare on the sensor system(s) 606. Alternatively, processing of the sensor data may be carried out other than at the sensor system(s) 606.

The sensor computing device(s) 608, including the sensor control system 636, may be configured to generate and/or process data in many formats. For example, and as noted above, the sensor computing device(s) 608 can measure a phase shift between the carrier and the response carrier and/or perform numerical integration calculations to determine the sensor data in the quadrature format. In other examples, the sensor computing device(s) 608 can determine an intensity and depth format of the sensor data, e.g., generate the depth and intensity images. For purposes of illustration only, the sensor system(s) 606 can determine the sensor data in the intensity and depth format where an individual pixel in the sensor data is associated with an 8-bit value for the intensity and a 12-bit value for the depth.

The pixel evaluation component 638 can be configured to receive sensor data generated by the sensor system(s) 606, e.g., by a time-of-flight senor, and determine regions that may be affected by glare. In examples, determining such regions may include identifying saturated pixels or pixels that are otherwise unreliable. For instance, highly-reflective objects may result in pixel saturation and/or otherwise unreliable sensor data at pixels associated with a location of such objects. The pixel evaluation component 638 may be the pixel evaluation component 122, described further herein.

The object determination component 640 can include functionality to identify objects that may cause glare (or otherwise result in saturated and/or unreliable pixels) and/or the location of such objects. For example, the object determination component 638 can determine the presence of a highly-reflective or glare-inducing object from information received from the pixel evaluation component 638. In at least one example, the presence and/or location of an object can be based on a presence of one or more saturated and/or unreliable pixels. The object determination component 640 may be the object location determination component 124. In at least some instances, functionality of the object determination component 640 can be carried out, at least in part, by the perception component 624, as described herein.

The sensor configuration determination component 642 may be the sensor system configuration determination component 126 and can include functionality to generate controls signals such as the emitter system configuration signals 128, the reconfiguration signals 310, the reconfiguration signals 412, and/or the reconfiguration signals 512. In some examples, the sensor configuration determination component 642 can receive information from the pixel evaluation component 638 and/or from the object determination component 640 to determine regions in a field of view of the sensor for which illumination intensity should be altered. In at least some examples, the sensor configuration determination component 642 can determine to reduce illumination proximate regions that include highly-reflective objects.

The emitter(s) 610 are configured for emitting light and/or sound, as described above. In the illustrated example, the emitter(s) 610 can include interior visual and/or interior audio emitters to communicate with passengers of the vehicle 602. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 610 in this example also include exterior emitters, which may be exterior visual and/or exterior audio emitters. By way of example and not limitation, the exterior emitters in this example can include lights to signal a direction of travel or other indicator of vehicle action (e.g., indicator lights, signs, light arrays, etc.) and one or more audio emitters (e.g., speakers, speaker arrays, horns, etc.) to audibly communicate with pedestrians or other nearby vehicles, one or more of which may comprise acoustic beam steering technology.

The communication connection(s) 612 enable communication between the vehicle 602 and one or more other local or remote computing device(s), including the sensor computing device(s) 608. For instance, the communication connection(s) 612 can facilitate communication with other local computing device(s) on the vehicle 602 and/or the drive module(s) 616. Also, the communication connection(s) 612 can allow the vehicle to communicate with other nearby computing device(s) (e.g., other nearby vehicles, traffic signals, etc.). The communications connection(s) 612 can also enable the vehicle 602 to communicate with a remote teleoperations computing device or other remote services.

The communications connection(s) 612 can include physical and/or logical interfaces for connecting the vehicle computing device(s) 604 to another computing device or an external network (e.g., the Internet). For example, the communications connection(s) 612 can enable Wi-Fi-based communication such as via frequencies defined by the IEEE 802.11 standards, short range wireless frequencies such as Bluetooth, cellular communication (e.g., 2G, 6G, 4G, 4G LTE, 5G, etc.) or any suitable wired or wireless communications protocol that enables the respective computing device to interface with the other computing device(s).

In some examples, the drive module(s) 616 can include a single drive module 616. In other examples, the vehicle 602 can have multiple drive modules, and individual drive modules 616 can be positioned on opposite ends of the vehicle 602 (e.g., the front and the rear, etc.). In at least one example, the drive module(s) 616 can include one or more sensor systems to detect conditions of the drive module(s) 616 and/or the surroundings of the vehicle 602. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LiDAR sensors, RADAR sensors, etc. Some sensors, such as the wheel encoders can be unique to the drive module(s) 616. In some cases, the sensor system(s) on the drive module(s) 616 can overlap or supplement corresponding systems of the vehicle 602 (e.g., the sensor system(s) 606).

The drive module(s) 616 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 616 can include a drive module controller which can receive and preprocess data from the sensor system(s) and to control operation of the various vehicle systems. In some examples, the drive module controller can include one or more processors and memory communicatively coupled with the one or more processors. The memory can store one or more modules to perform various functionalities of the drive module(s) 616. Furthermore, the drive module(s) 616 also include one or more communication connection(s) that enable communication by the respective drive module with one or more other local or remote computing device(s).

The processor(s) 618 of the vehicle 602, the processor(s) 632 of the sensor computing device(s) 608, and/or the processor(s) 106 of the sensor system(s) 104 can be any suitable processor capable of executing instructions to process data and perform operations as described herein. By way of example and not limitation, the processor(s) 618, 632, 106 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 620, 634, 108 are examples of non-transitory computer-readable media. The memory 620, 634, 108 can store an operating system and one or more software applications, instructions, programs, and/or data to implement the methods described herein and the functions attributed to the various systems. In various implementations, the memory 620, 634, 108 can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine learning algorithms. For example, in some instances, the components in the memory 620, 634, 108 can be implemented as a neural network.

As described herein, an exemplary neural network is a biologically inspired algorithm which passes input data through a series of connected layers to produce an output. Each layer in a neural network can also comprise another neural network or can comprise any number of layers (whether convolutional or not). As can be understood in the context of this disclosure, a neural network can use machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

Figure 7:
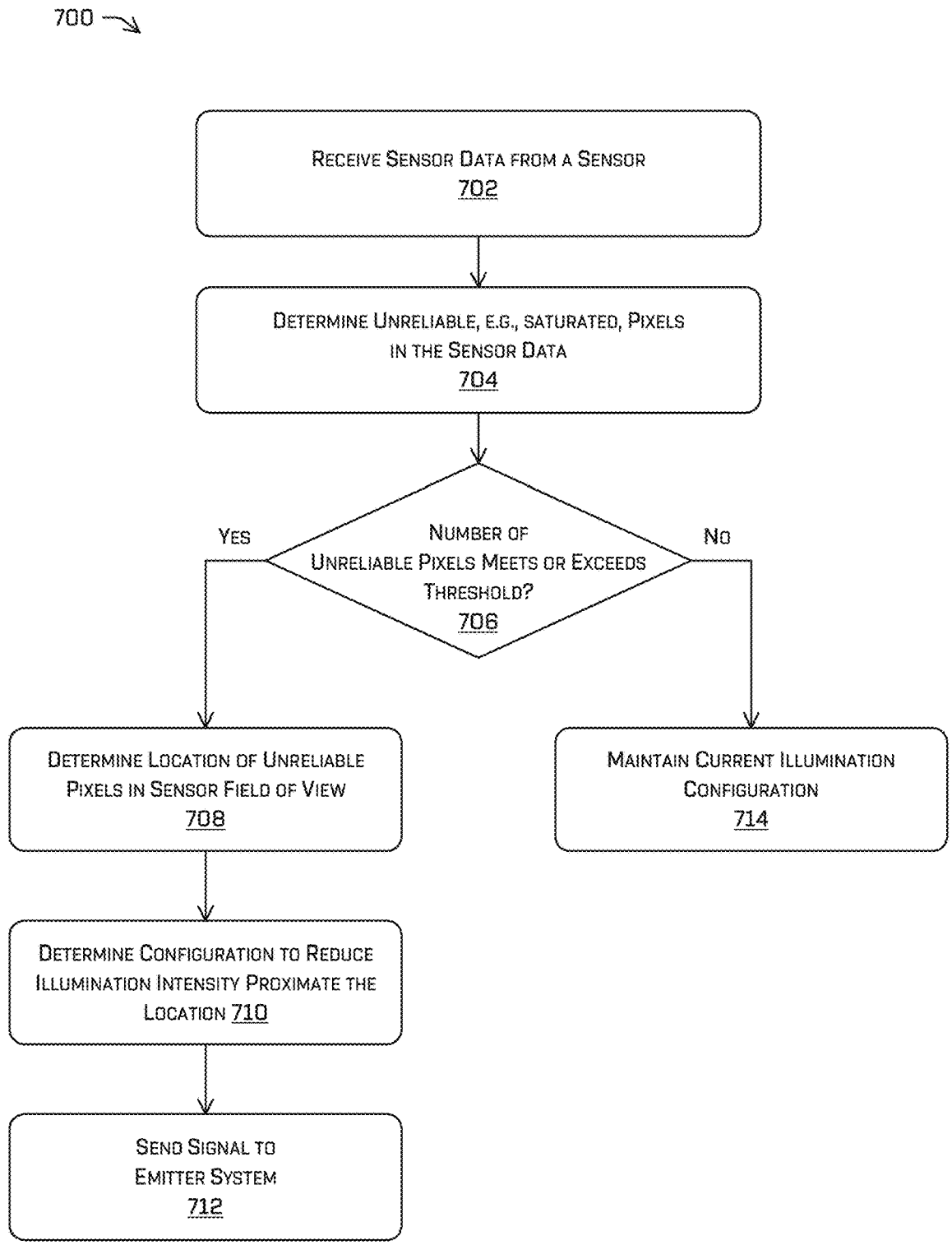
FIG. 7 is a flowchart illustrating an example method for controlling a sensing system to reduce inaccuracies caused by glare, as described herein.

FIGS. 7 and 8 (and portions of FIG. 2, discussed above) illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

In more detail, FIG. 7 depicts an example process 700 for configuring a sensor to reduce the effects of glare. For example, some or all of the process 700 can be performed by the sensor system(s) 104 and/or by one or more components illustrated in FIG. 6, as described herein. For example, some or all of the process 700 can be performed by the sensor computing device(s) 608 of the sensor system(s) 606, including, but not limited to, the pixel evaluation component 638, the object determination component 640, and/or the sensor configuration determination component 642. However, the process 700 is not limited to being performed by these components, and the components are not limited to performing the process 700.

At operation 702, the process 700 includes receiving sensor data from a sensor. For example, techniques described herein may be useful for adjusting settings of a time-of-flight sensor based at least in part on sensor data received therefrom. The operation 702 may include receiving time-of-flight sensor data as intensity and/or depth information generated with the time-of-flight sensor in a first configuration. In at least some examples, the time-of-flight sensor may be configured to provide a generally uniform illumination in a field of view of the sensor.

At operation 704, the process 700 can include determining unreliable pixels in the sensor data. In some examples, the unreliable pixels in the sensor data can be saturated pixels, e.g., overexposed pixels. For instance, the pixel evaluation component 122 or the pixel evaluation component 638 can determine that pixels having an intensity value equal to or above a threshold intensity are unreliable. In other instances, unreliable pixels may be determined using other techniques described herein or incorporated by reference herein. For instance, unreliable pixels may be determined from an analysis of phase value information associated with the sensor data. In at least some examples, unreliable pixels may be the result of glare caused by one or more objects in the field of view that are highly-reflective, e.g., because of their surface composition and/or their close proximity to the sensor.

At operation 706, the process 700 can include determining whether a number of unreliable pixels meets or exceeds a threshold. For example, the operation 706 can include determining whether a number of unreliable pixels in a region or portion of the sensor data meets or exceeds a threshold number of unreliable pixels. As detailed herein, in particular with reference to FIG. 2, the number of unreliable pixels may be determined for each area corresponding to a segment of the field of view for which illumination intensity can be independently altered. In examples, the threshold referred to in the operation 706 may be a threshold number of pixels, a threshold ratio, e.g., of unreliable pixels to reliable pixels or to total pixels, or some other metric. In implementations, the threshold may be based on heuristics, and may generally be established as lower boundary associated with reliable sensor data. Accordingly, as the unreliable pixels are determined to meet or exceed the threshold, the data associated with the respective section or region may be deemed unreliable.

If, at the operation 706, it is determined that the number of unreliable pixels does meet or exceed the threshold, at operation 708 the process 700 can include determining a location of the unreliable pixels in the sensor field of view. For example, unreliable pixels can identify a location of an object. The location of the unreliable pixels may be determined as one or more regions or portions of the field of view corresponding to region(s) or portion(s) for which the illumination intensity can be altered. In the example of FIG. 2, the operation 706 can determine the location of the object as one of the areas 244, 246. The location of the object may also include adjacent areas in some instances.

At an operation 710, the process 700 can also include determining a configuration to reduce illumination intensity proximate the location. For example, in the context of FIG. 3, the operation 710 can include determining which light emitters 304 illuminate the object and/or areas proximate the object. In the context of FIGS. 4 and 5, the operation 710 can include determining which of the digital micromirror device(s) 406 can affect illumination of the object and/or areas proximate the object and determining which addressable pixels 506 can affect illumination of the object and/or areas proximate the object, respectively. In some implementations, the operation 710 can also include generating a control signal to implement the new configuration.

At operation 712, the process 700 can also include sending a signal to an emitter system. For example, the signal may be a signal to an emitter of the time-of-flight sensor. Upon receipt of the signal, the sensor may configure components of the sensor to implement the desired change, e.g., by reducing an illumination intensity at one or more portions of the field of view. Once implemented at the sensor, subsequent image data can be captured with the sensor adjusted to reduce the deleterious effects of glare.

If, at the operation 706, it is determined that the number of unreliable pixels does not meet or exceed the threshold, at operation 714 the process 700 can include maintaining the current illumination configuration.

Modifications to the process 700 also are contemplated. By way of non-limiting example, in some instances, the emitter system may be reconfigured in the absence of determining that pixels are unreliable. For instance, an operation similar to the operation 708 may include determining information about an object in the field of view or soon to be in the field of view. The information may include a type of the object and/or a location of the object, for example. For instance, the location and/or type of the object may be known from map data, sensor data from different modalities, or the like. When the object is known to be a highly-reflective object or is relatively close to the sensor, the process 700 may proceed to the operation 710. Stated differently, in some implementations the emitter system can be reconfigured in anticipation or expectation of glare, despite that the glare may not yet be saturating pixels.

Other modifications to the systems and techniques described herein also are contemplated. In the illustration of FIG. 3, when the light emitters 304 are VCSELs, light may be emitted from each of the emitters 304 generally perpendicularly to the light emitter array 302, e.g., normal to the plane of the figure. In such embodiments, the VCSELs may emit light in a conical fashion, e.g., widening at distances from the array 302. Accordingly, the field of view is not limited to the size of the light emitter array 302. In other implementations, modifications to the arrangement of the light emitter array 302 may be made to further increase the field of view of the light emitter array. For instance, the light emitter array 302 may be configured such that the light emitters 304 may be angled relative to a normal direction. Stated differently, if viewed from an edge of the light emitter array 302, an axis passing through a center of one of the light emitters 304 may be other than vertical or horizontal. In some examples, the light emitters 304 can be disposed on an angled or otherwise contoured substrate. In at least one such example, the substrate may come to a maximum height proximate a center of the light emitter array 302 and reduce in height to edges of the array 302, e.g., as in a pyramid or triangular cross-section.

The various techniques described herein can be implemented in the context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks, or implement particular abstract data types.

Other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

Example Clauses

A: An example system includes: a time-of-flight sensor including one or more light emitters configured to emit emitted light into an environment and a receiver configured to receive reflected light corresponding to at least a portion of the emitted light after reflecting off an object in the environment; one or more processors; and memory storing processor-executable instructions that, when executed by the one or more processors, configure the vehicle to perform actions comprising: receiving first sensor data from the time-of-flight sensor, the first sensor data corresponding to first reflected light associated with the time-of-flight sensor configured in a first configuration; determining a location of an object in the field of view of the time-of-flight sensor; determining a second configuration for the time-of-flight sensor, the second configuration reducing an illumination intensity of the emitted light at a portion of the field of view proximate the location; and generating a signal to configure the time-of-flight sensor in the second configuration.

B: The system of example A, the operations further comprising: determining, based at least in part on the first sensor data, unreliable pixels in the first sensor data, wherein the determining the second configuration is based at least in part on a number of unreliable pixels in the first sensor data exceeding a threshold number of unreliable pixels.

C: The system of example A or example B, wherein: the one or more light emitters comprise an array of light emitters; the first configuration comprises emitting light from a first subset of the array of light emitters; and the second configuration comprises emitting light from a second subset of the array of light emitters, the second subset being different from the first subset.

D: The system of any one of example A through example C, further comprising: a projection system comprising one or more digital micromirror devices configurable in a first orientation to reflect the emitted light in a first direction and a second orientation to reflect the emitted light in a second direction, at least one of the digital micromirror devices being arranged in the first orientation in the first configuration and in the second orientation in the second configuration.

E: The system of any one of example A through example D, further comprising: a liquid crystal display comprising a plurality of pixels having a selectable opacity, wherein the emitted light passes through the liquid crystal display, and wherein, in the first configuration, a first pixel of the plurality of pixels has a first opacity and, in the second configuration, the first pixel has a second opacity.

F: An example time-of-flight sensing system includes: one or more light emitters configured to emit emitted light into an environment; a receiver configured to receive reflected light corresponding to at least a portion of the emitted light after reflecting off an object in the environment; one or more processors; and memory storing processor-executable instructions that, when executed by the one or more processors, configure the time-of-flight sensor to perform actions comprising: configuring the time-of-flight sensor in a first configuration; determining a region of the field of view of the time-of-flight sensor associated with an amount of reflected light that causes at least a portion of the receiver to become oversaturated; and configuring the time-of-flight sensor in a second configuration, the second configuration reducing an illumination intensity of the emitted light at the region.

G: The time-of-flight sensing system of example F, wherein: determining the region of the field of view comprises determining a position of an object in the field of view; the reducing the illumination intensity of the emitted light proximate the object comprises reducing an illumination intensity at the position, and the configuring time-of-flight sensor in the second configuration comprises maintaining, from the first configuration, an illumination intensity of the emitted light at a second position spaced from the first position.

H: The time-of-flight sensing system of example G, the actions further comprising: receiving sensor data from the time-of-flight sensor in the first configuration; and determining a number of pixels in the sensor data impacted by the amount of reflected light that causes at least a portion of the receiver to become oversaturated, wherein a location of the region is associated with the number of pixels.

I: The time-of-flight sensing system of example G or example H, wherein the sensor data comprises at least one of: intensity information comprising pixel intensities, wherein the number of pixels comprise pixels having pixel intensities over a threshold intensity; or phase frames comprising pixel phase values, wherein the number of pixels comprise pixels for which a sum of the pixel phase values quals other than substantially zero.

J: The time-of-flight sensing system of any one of example G through example I, wherein: the one or more light emitters comprise an array of light emitters configured to illuminate a field of view associated with the time-of-flight sensor; in the first configuration, emitted light from one or more first light emitters of the one or more light emitters has a first illumination intensity; in the second configuration, emitted light from the one or more first light emitters has a second illumination intensity lower than the first illumination intensity; and the one or more first light emitters illuminate a portion of the field of view corresponding to the object.

K: The time-of-flight sensing system of any one of example G through example J, wherein: the array of light emitters comprises a plurality of rows of light emitters and a plurality of columns of light emitters; the first subset of light emitters comprises at least one of a first row of the plurality of rows or a first column of the plurality of columns.

L: The time-of-flight sensing system of any one of example G through example K, the actions further comprising: determining a location of the object in the field of view of the time-of-flight sensor; and determining the at least one of the first row or the first column as containing a light emitter corresponding to the location.

M: The time-of-flight sensing system of any one of example G through example L, wherein: the array of light emitters comprises an array of vertical cavity surface emitting lasers (VCSELs); a first VCSEL of the VCSELs is arranged to emit light along a first axis; and a second VCSEL of the VCSELs is arranged to emit light along a second axis angled relative to the first axis.

N: The time-of-flight sensing system of any one of example G through example M, further comprising: a projection system disposed in a path of the emitted light, the projection system comprising one or more digital micromirror devices configurable in a first orientation and a second orientation, wherein: at least one of the digital micromirror devices is arranged in the first orientation in the first configuration, and the at least one of the digital micromirror devices is arranged in the second orientation in the second configuration.

O: The time-of-flight sensing system of any one of example G through example N, further comprising: a liquid crystal display disposed in a path of the emitted light, the liquid crystal display comprising a plurality of pixels having a selectable opacity, wherein, in the first configuration, a first pixel of the plurality of pixels has a first opacity and, in the second configuration, the first pixel has a second opacity.

P: An example method includes: receiving, from a time-of-flight sensing system configured in a first configuration, first time-of-flight data corresponding to a field of view of the time-of-flight sensing system; determining, from the time-of-flight data, a number of pixels impacted by excessive light received at a receiver of the time-of-flight sensing system, the excessive light causing the number of pixels to be unreliable pixels; determining a location in the field of view corresponding to the number of pixels; determining a second configuration for the time-of-flight sensing system, the second configuration reducing an illumination intensity of emitted light proximate the location; and generating a signal to configure the time-of-flight sensing system in the second configuration.

Q: The method of example P, wherein: the time-of-flight sensing system comprises a plurality of light emitters; the determining the second configuration comprises determining a subset of the plurality of light emitters illuminating a portion of the field of view proximate the location; and the signal to configure the time-of-flight sensing system in the second configuration comprises an instruction to at least one of reduce or inhibit light emission from the subset of the plurality of light emitters.

R: The method of example P or example Q, wherein: the plurality of light emitters comprises an array of light emitters including a plurality of rows of light emitters and a plurality of columns of light emitters; the determining the second configuration comprises determining a light emitter from the array of light emitters illuminating the portion of the field of view; and the signal to configure the time-of-flight sensing system in the second configuration comprises an instruction to at least one of reduce or inhibit light emission from light emitters in a row of the plurality of rows corresponding to the light emitter or reduce or inhibit light emission from light emitters in a column of the plurality of columns corresponding to the light emitter.

S: The method of any one of example P through example R, wherein: the time-of-flight sensing system comprises a projection system comprising one or more digital micromirror devices configurable in a first orientation to reflect emitted light in a first direction and a second orientation to reflect the emitted light in a second direction; a digital micromirror device of the digital micromirror devices is configured in the first orientation in the first configuration, and the signal to configure the time-of-flight sensing system comprises an instruction to configure the digital micromirror device in the second orientation in the second configuration.

T: The method of any one of example P through example S, wherein: the time-of-flight sensing system comprises a liquid crystal display comprising a plurality of pixels having a configurable opacity; emitted light from the time-of-flight sensing system passes through the liquid crystal display; in the first configuration, a first pixel of the plurality of pixels corresponding to the location has a first opacity; and the signal to configure the time-of-flight sensing system comprises an instruction to increase the opacity of the first pixel.

Conclusion

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations described herein need not be performed in the order disclosed, and other examples using alternative orderings of the computations could be readily implemented. In addition to being reordered, in some instances, the computations could also be decomposed into sub-computations with the same results.

What is claimed is:

1. A system comprising:
a time-of-flight sensor including an array of light emitters comprising a plurality of rows of light emitters and a plurality of columns of light emitters configured to emit emitted light into an environment;
a receiver configured to receive reflected light corresponding to at least a portion of the emitted light after reflecting off an object in the environment;
one or more processors; and
memory storing processor-executable instructions that, when executed by the one or more processors, configure a vehicle to perform operations comprising:
receiving first sensor data from the time-of-flight sensor, the first sensor data corresponding to first reflected light associated with the time-of-flight sensor configured in a first configuration, the first configuration configuring the time-of-flight sensor to emit the emitted light at a first illumination intensity;
determining a location of an object in a field of view of the time-of-flight sensor, the location corresponding to a position of one or more saturated pixels in the first sensor data;
determining a second configuration for the time-of-flight sensor, the second configuration configuring the time-of-flight sensor to emit a first portion of the emitted light corresponding to a first portion of the field of view proximate the location at a second illumination intensity lower than the first illumination intensity by decreasing one or more of a voltage or a current supplied to one or more light emitters associated with the first portion and to emit a second portion of the emitted light corresponding to a second portion of the field of view excluding the first portion at the first illumination intensity, wherein the first portion of the emitted light comprises at least one of a first row of the plurality of rows or a first column of the plurality of columns; and
generating a signal to configure the time-of-flight sensor in the second configuration.

2. The system of claim 1, the operations further comprising:
determining, based at least in part on the first sensor data, unreliable pixels in the first sensor data,
wherein the determining the second configuration is based at least in part on a number of unreliable pixels in the first sensor data exceeding a threshold number of unreliable pixels.

3. The system of claim 1, wherein:
the first configuration comprises emitting light from a first subset of the array of light emitters; and
the second configuration comprises emitting light from a second subset of the array of light emitters, the second subset being different from the first subset.

4. The system of claim 1, further comprising:
a projection system comprising one or more digital micromirror devices configurable in a first orientation to reflect the emitted light in a first direction and a second orientation to reflect the emitted light in a second direction, at least one of the one or more digital micromirror devices being arranged in the first orientation in the first configuration and in the second orientation in the second configuration.

5. The system of claim 1, further comprising:
a liquid crystal display comprising a plurality of pixels having a selectable opacity,
wherein the emitted light passes through the liquid crystal display, and
wherein, in the first configuration, a first pixel of the plurality of pixels has a first opacity and, in the second configuration, the first pixel has a second opacity.

6. A time-of-flight sensing system comprising:
an array of light emitters comprising a plurality of rows of light emitters and a plurality of columns of light emitters configured to emit emitted light into an environment;
a receiver configured to receive reflected light corresponding to at least a portion of the emitted light after reflecting off an object in the environment;
one or more processors; and
memory storing processor-executable instructions that, when executed by the one or more processors, configure a time-of-flight sensor to perform actions comprising:
configuring the time-of-flight sensor in a first configuration, the first configuration configured to emit the emitted light at a first illumination intensity;
determining a first region of a field of view of the time-of-flight sensor associated with an amount of reflected light that causes at least a portion of the receiver to become oversaturated; and
configuring the time-of-flight sensor in a second configuration, the second configuration configured to:
emit a first portion of the emitted light corresponding to the first region at a second illumination intensity lower than the first illumination intensity by decreasing one or more of a voltage or a current supplied to one or more light emitters associated with the first portion, the first portion of the emitted light comprises at least one of a first row of the plurality of rows or a first column of the plurality of columns, and
emit a second portion of the emitted light corresponding to a second region of the field of view excluding the first region at the first illumination intensity.

7. The time-of-flight sensing system of claim 6, wherein:
determining the first region of the field of view comprises determining a position of the object in the field of view; and
the configuring the time-of-flight sensor in the second configuration comprises maintaining, from the first configuration, an illumination intensity of the emitted light at the second region of the field of view proximate the first region.

8. The time-of-flight sensing system of claim 6, the actions further comprising:
receiving sensor data from the time-of-flight sensor in the first configuration; and
determining a number of pixels associated with the portion of the receiver that is oversaturated,
wherein a location of the first region is associated with the number of pixels.

9. The time-of-flight sensing system of claim 8, wherein the sensor data comprises at least one of:
intensity information comprising pixel intensities, wherein the number of pixels comprise pixels having pixel intensities over a threshold intensity; or
phase frames comprising pixel phase values, wherein the number of pixels comprise pixels for which a sum of the pixel phase values equals other than substantially zero.

10. The time-of-flight sensing system of claim 6, the actions further comprising:
determining a location of the object in the field of view of the time-of-flight sensor; and
determining the at least one of the first row or the first column as containing a light emitter corresponding to the location.

11. The time-of-flight sensing system of claim 6, wherein:
the array of light emitters comprises an array of vertical cavity surface emitting lasers (VCSELs);
a first VCSEL of the VCSELs is arranged to emit light along a first axis; and
a second VCSEL of the VCSELs is arranged to emit light along a second axis angled relative to the first axis.

12. The time-of-flight sensing system of claim 6, further comprising:
a projection system disposed in a path of the emitted light, the projection system comprising one or more digital micromirror devices configurable in a first orientation and a second orientation, wherein:
at least one of the one or more digital micromirror devices is arranged in the first orientation in the first configuration, and
the at least one of the one or more digital micromirror devices is arranged in the second orientation in the second configuration.

13. The time-of-flight sensing system of claim 6, further comprising:
a liquid crystal display disposed in a path of the emitted light, the liquid crystal display comprising a plurality of pixels having a selectable opacity,
wherein, in the first configuration, a first pixel of the plurality of pixels has a first opacity and, in the second configuration, the first pixel has a second opacity.

14. A method comprising:
receiving, from a time-of-flight sensing system configured in a first configuration, the first configuration configured to emit light at a first illumination intensity, time-of-flight data corresponding to a field of view of the time-of-flight sensing system;
determining, from the time-of-flight data, a number of pixels impacted by excessive light received at a receiver of the time-of-flight sensing system, the excessive light causing the number of pixels to be unreliable pixels;
determining a location in the field of view corresponding to the number of pixels, the location corresponding to an object associated with an object type;
determining, based at least in part on the object type, a second configuration for the time-of-flight sensing system, the second configuration reducing an illumination intensity of emitted light at the location in the field of view from the first illumination intensity to a second illumination intensity lower than the first illumination intensity by decreasing one or more of a voltage or a current supplied to one or more light emitters associated with the location; and
generating a signal to configure the time-of-flight sensing system in the second configuration.

15. The method of claim 14, wherein:
the time-of-flight sensing system comprises a plurality of light emitters;
the determining the second configuration comprises determining a subset of the plurality of light emitters illuminating a portion of the field of view proximate the location; and
the signal to configure the time-of-flight sensing system in the second configuration comprises an instruction to at least one of reduce or inhibit light emission from the subset of the plurality of light emitters.

16. The method of claim 15, wherein:
the plurality of light emitters comprises an array of light emitters including a plurality of rows of light emitters and a plurality of columns of light emitters;

the determining the second configuration comprises determining a light emitter from the array of light emitters illuminating the portion of the field of view; and the signal to configure the time-of-flight sensing system in the second configuration comprises an instruction to at least one of reduce or inhibit light emission from light emitters in a row of the plurality of rows corresponding to the light emitter or reduce or inhibit light emission from light emitters in a column of the plurality of columns corresponding to the light emitter.

17. The method of claim 14, wherein:

the time-of-flight sensing system comprises a projection system comprising one or more digital micromirror devices configurable in a first orientation to reflect emitted light in a first direction and a second orientation to reflect the emitted light in a second direction;

a digital micromirror device of the one or more digital micromirror devices is configured in the first orientation in the first configuration, and the signal to configure the time-of-flight sensing system comprises an instruction to configure the digital micromirror device in the second orientation in the second configuration.

18. The method of claim 14, wherein:

the time-of-flight sensing system comprises a liquid crystal display comprising a plurality of pixels having a configurable opacity;

emitted light from the time-of-flight sensing system passes through the liquid crystal display;

in the first configuration, a first pixel of the plurality of pixels corresponding to the location has a first opacity; and the signal to configure the time-of-flight sensing system comprises an instruction to increase the configurable opacity of the first pixel.

19. The system of claim 1, the operations further comprising:

determining, based at least in part on the first sensor data, a first number of unreliable pixels and a second number of reliable pixels in the first sensor data, wherein determining the second configuration is based at least in part on the first number of unreliable pixels and the second number of reliable pixels in the first sensor data exceeding a threshold ratio.

20. The system of claim 1, wherein individual rows of the plurality of rows of light emitters and individual columns of the plurality of columns of light emitters are associated with individual drivers configured to control a row or a column of the array of light emitters.

* * * * *